United States Patent
Vaze et al.

(10) Patent No.: US 10,482,376 B1
(45) Date of Patent: Nov. 19, 2019

(54) USER INTERFACE FOR ASSESSMENT OF CLASSIFICATION MODEL QUALITY AND SELECTION OF CLASSIFICATION MODEL CUT-OFF SCORE

(71) Applicant: SAS Institute Inc., Cary, NC (US)

(72) Inventors: Amrut Shantaram Vaze, Pune (IN); Michael Ryan Chipley, Raleigh, NC (US); Leigh Anne Ward, Raleigh, NC (US); Ashish Mishra, Pune (IN); Steven Todd Barlow, Raleigh, NC (US); Suchitra Balaso Chikhalkar, Pune (IN); Sameer Waman Tatke, Pune (IN)

(73) Assignee: SAS Institute Inc., Cary, NC (US)

(*) Notice: Subject to any disclaimer, the term of this patent is extended or adjusted under 35 U.S.C. 154(b) by 0 days.

(21) Appl. No.: 16/225,741

(22) Filed: Dec. 19, 2018

(30) Foreign Application Priority Data

Sep. 13, 2018 (IN) .............................. 201811034578

(51) Int. Cl.
    *G06F 15/18*      (2006.01)
    *G06N 3/08*      (2006.01)
    *G06N 20/00*      (2019.01)
    *G06N 5/02*      (2006.01)

(52) U.S. Cl.
    CPC .................. *G06N 3/08* (2013.01); *G06N 5/02* (2013.01); *G06N 20/00* (2019.01)

(58) Field of Classification Search
    CPC ........ G06F 8/38; G06F 5/022; G06Q 30/0251
    USPC ..................................................... 706/15, 45
    See application file for complete search history.

(56) References Cited

U.S. PATENT DOCUMENTS

| | | | |
|---|---|---|---|
| 8,655,695 B1* | 2/2014 | Qu ..................... | G06Q 30/0251 705/14.49 |
| 2017/0220943 A1* | 8/2017 | Duncan .............. | G06Q 30/0201 |
| 2019/0019213 A1* | 1/2019 | Silberman .......... | G06Q 30/0243 |
| 2019/0102462 A1* | 4/2019 | Botea .................... | G06Q 50/01 |

OTHER PUBLICATIONS

Srivastava, T., "7 Important Model Evaluation Error Metrics Everyone should know", Analytics Vidhya, Feb. 19, 2016, pp. 1-17, online blog, obtained on Dec. 19, 2018, obtained from internet: https://www.analyticsvidhya.com/blog/2016/02/7-important-model-evaluation-error-metrics/.

* cited by examiner

*Primary Examiner* — David R Vincent
(74) *Attorney, Agent, or Firm* — Coats & Bennett, PLLC

(57) ABSTRACT

The computing device generates a classification model providing prediction data indicating predicted users in a target population who will respond to a target stimulus according to a predefined user response category. The computing device displays in GUI a graphical representation of a generated classification model and a plurality of options each specifying one of different objectives for determining a proportion of users in the target population to expose to the target stimulus. The computing device predicts proportion data indicating the proportion of users in the target population to expose to the target stimulus based on the determined location of the cut-off. The computing device issues one or more indications as to whether to use the classification model as a basis for exposing the proportion of users in the target population to the target stimulus according to the proportion data.

30 Claims, 25 Drawing Sheets
(2 of 25 Drawing Sheet(s) Filed in Color)

USER INTERFACE FOR ASSESSMENT OF CLASSIFICATION MODEL QUALITY AND SELECTION OF CLASSIFICATION MODEL CUT-OFF SCORE

RELATED APPLICATIONS

This application is a U.S. Utility Application which claims the benefit of IN Provisional Application No. 201811034578, filed Sep. 13, 2018, the disclosure of which is incorporated herein by reference in its entirety This application is a related application to U.S. Design application No. 29/674055, filed Dec. 19, 2018 and U.S. Design application No. 29/674059, filed Dec. 19, 2018.

SUMMARY

In an example embodiment, a computer-program product tangibly embodied in a non-transitory machine-readable storage medium is provided. The computer-program product includes instructions to cause a computing device to issue one or more indications as to whether to use the classification model as a basis for exposing a proportion of users in a target population to a target stimulus. The computing device receives received data regarding results of exposing a sample population to a sample stimulus. The computing device generates, based on the received data, a classification model providing prediction data indicating predicted users in a target population who will respond to a target stimulus according to a predefined user response category. The computing device displays in a graphical user interface (GUI) a graphical representation of the generated classification model and a plurality of options each specifying one of different objectives for determining a proportion of users in the target population to expose to the target stimulus. The graphical representation plots, according to the generated classification model, the prediction data as a function of a variable number of users eligible to receive the target stimulus. A cut-off in the graphical representation graphically separates the variable number of users of the classification model into two regions, a first region that corresponds to target data for a target group to receive the target stimulus and a second region that corresponds to exclusion data for an excluded group to not receive the target stimulus. The plurality of options control a location of the cut-off in the graphical representation. The plurality of options comprise a first option that indicates that the location of the cut-off accounts for a first factor for increasing a number of targeted users who will respond to the target stimulus according to a predefined user response category and a second factor related to a detriment of a user of the GUI from employing the target stimulus. The first factor is different from the second factor. The computing device receives data input from the user of the GUI selecting a selected option of the plurality of options. The computing device determines the location of the cut-off in the graphical representation of the generated classification model based on the selected option. The computing device predicts proportion data indicating the proportion of users in the target population to expose to the target stimulus based on the determined location of the cut-off. The computing device determines one of predefined quality categories for the classification model. The computing device, responsive to the received data input and the determined one of the predefined quality categories, issues one or more indications as to whether to use the classification model as a basis for exposing the proportion of users in the target population to the target stimulus according to the proportion data.

In another example embodiment, a computing device is provided. The computing device includes, but is not limited to, a processor and memory. The memory contains instructions that when executed by the processor control the computing device to issue one or more indications as to whether to use the classification model as a basis for exposing a proportion of users in a target population to a target stimulus.

In another example embodiment, a method is provided of issuing one or more indications as to whether to use the classification model as a basis for exposing a proportion of users in a target population to a target stimulus.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
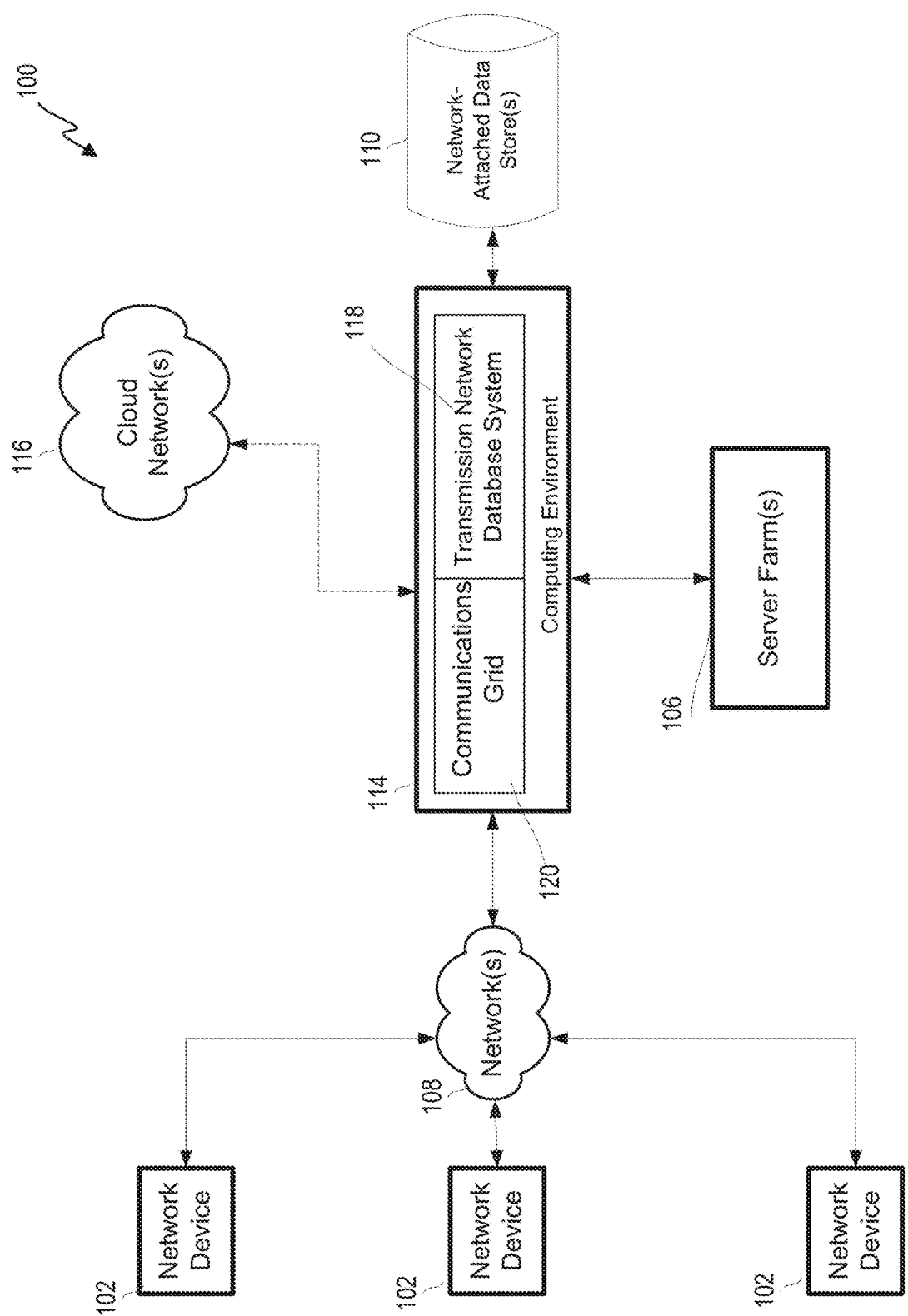
FIG. 1 illustrates a block diagram that provides an illustration of the hardware components of a computing system, according to at least one embodiment.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
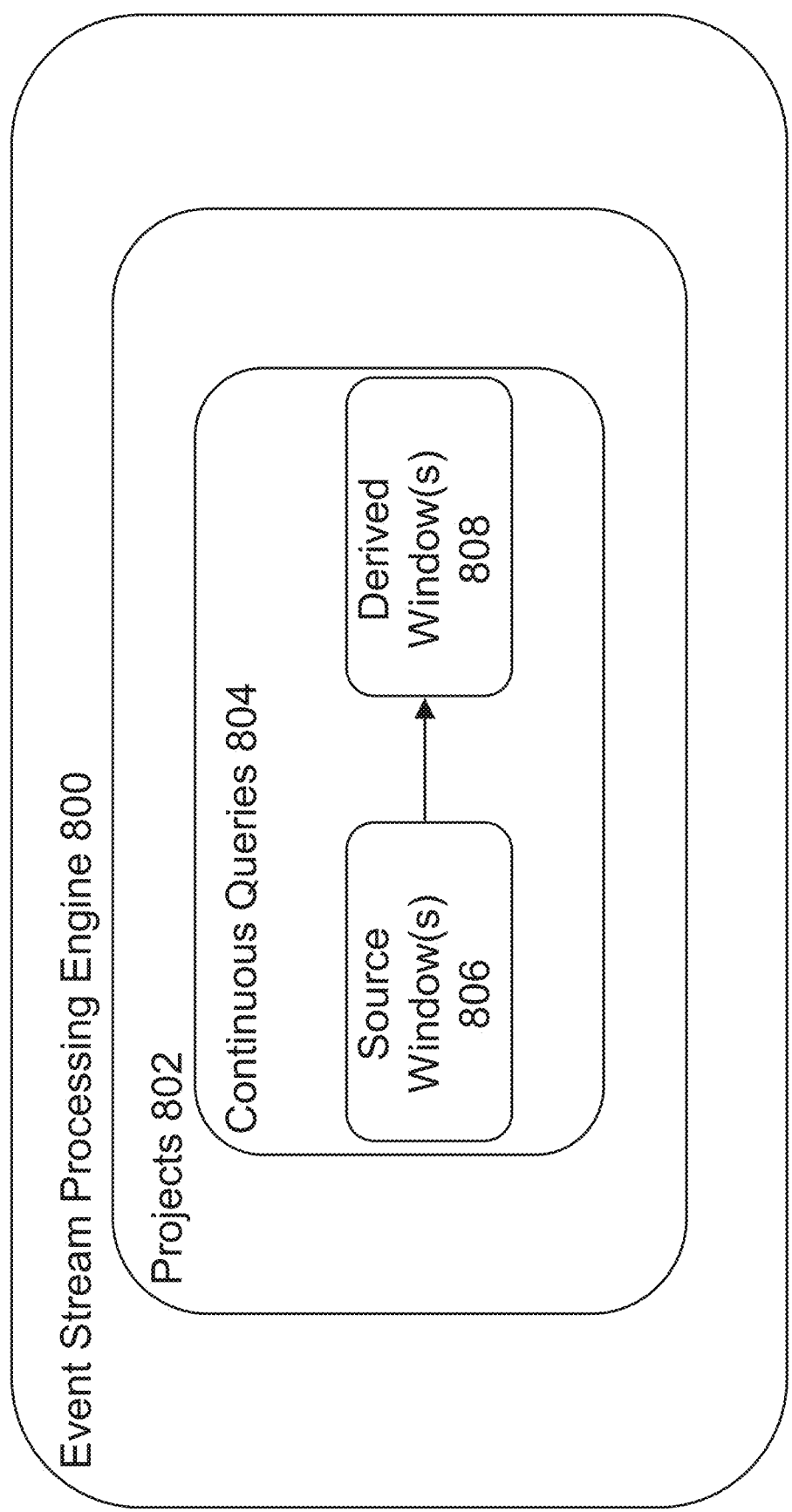
FIG. 8 illustrates a block diagram including components of an Event Stream Processing Engine (ESPE), according to at least one embodiment.
Figure 9:
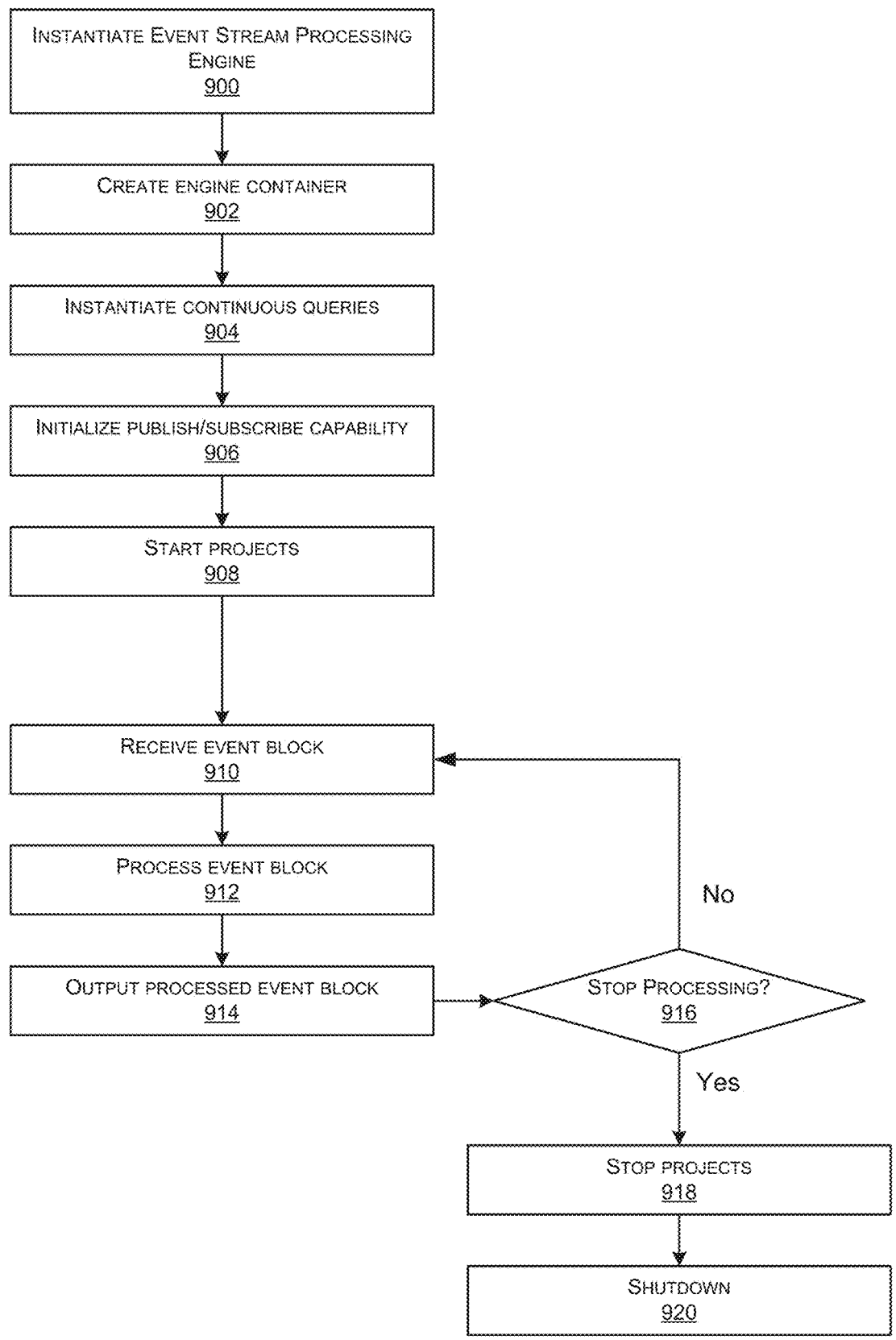
FIG. 9 illustrates a flow chart showing an example process including operations performed by an event stream processing engine, according to at least one embodiment.
Figure 10:
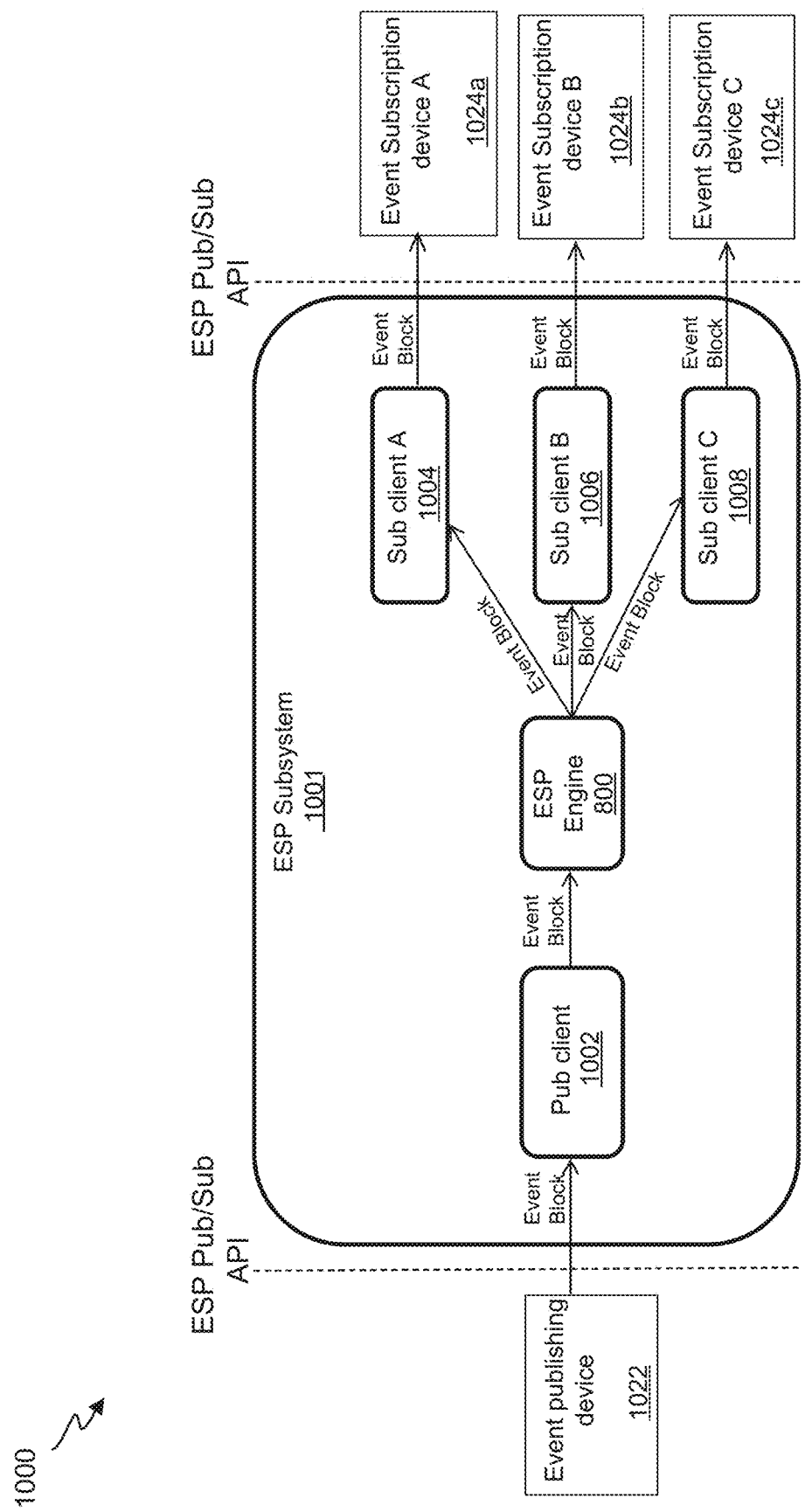
FIG. 10 illustrates an ESP system interfacing between a publishing device and multiple event subscribing devices, according to at least one embodiment.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
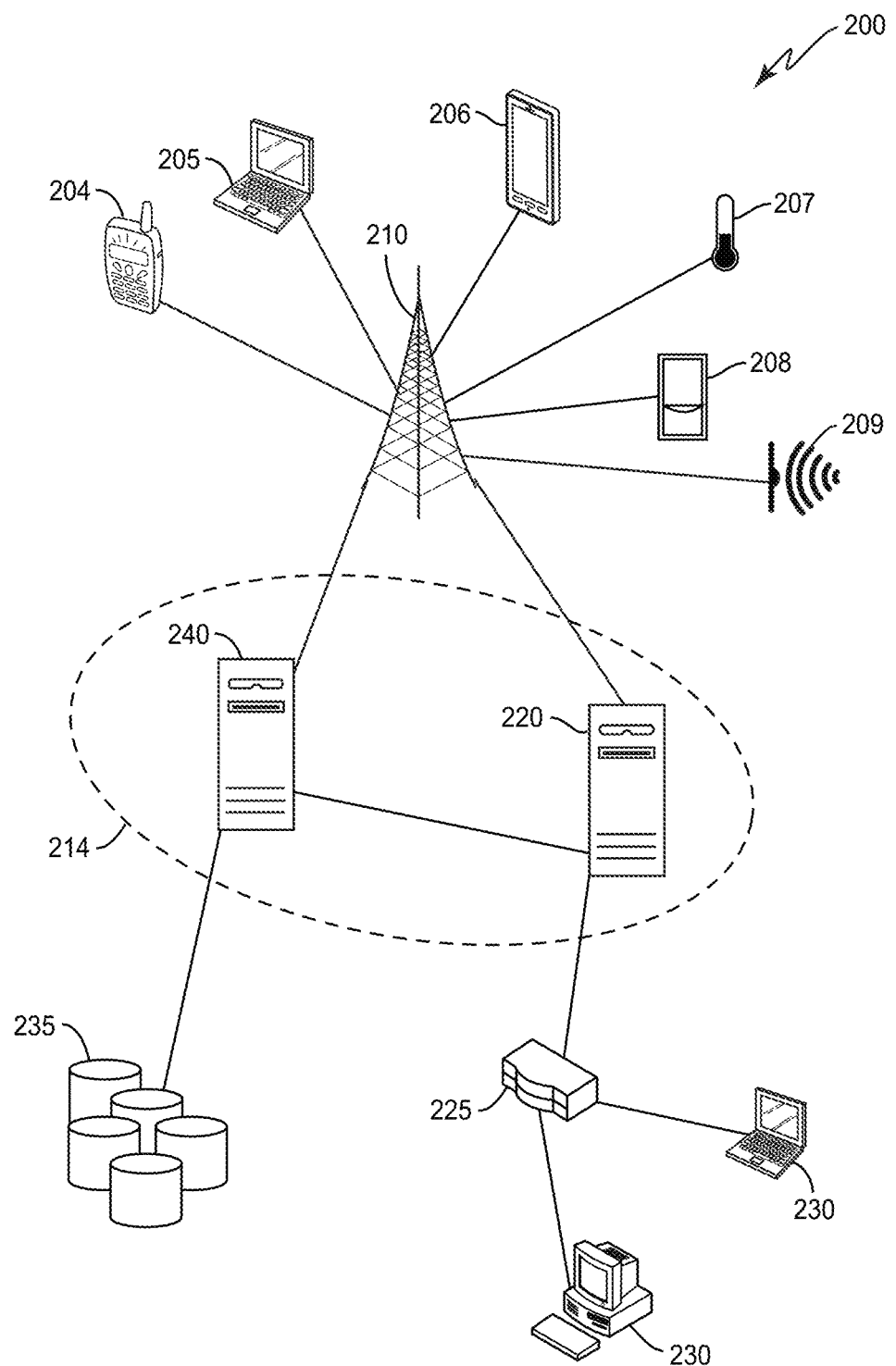
FIG. 2 illustrates an example network including an example set of devices communicating with each other over an exchange system and via a network, according to at least one embodiment.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
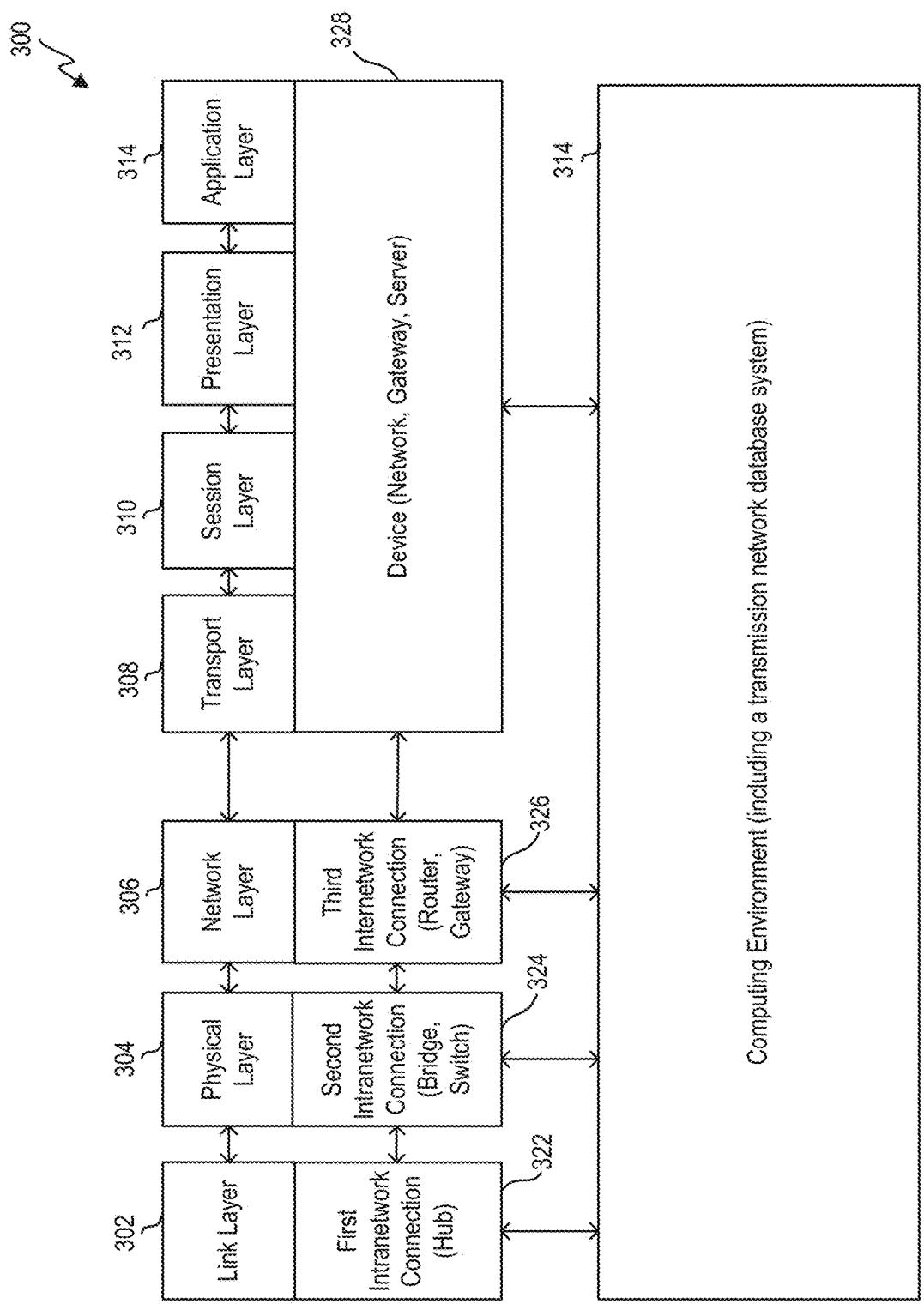
FIG. 3 illustrates a representation of a conceptual model of a communications protocol system, according to at least one embodiment.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
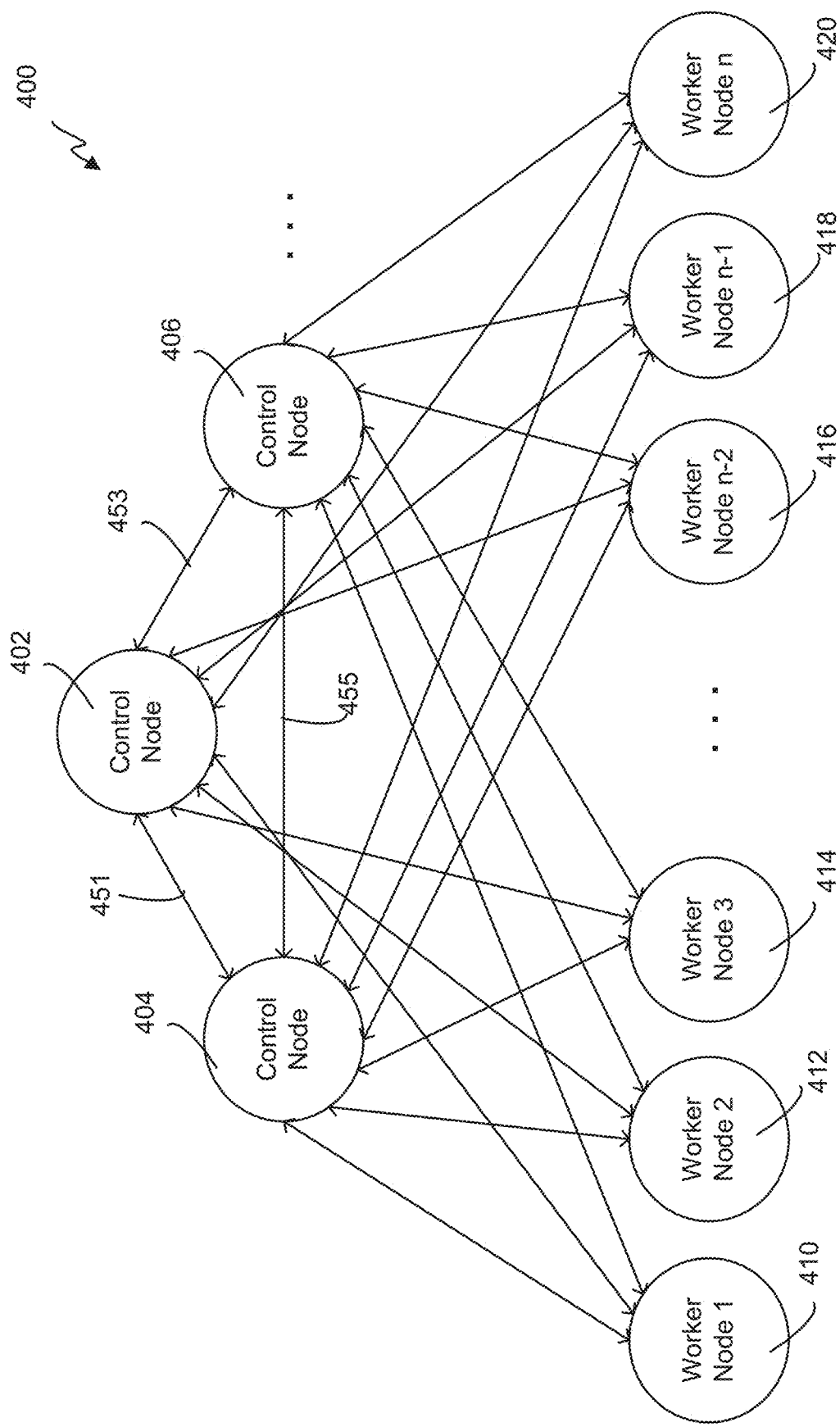
FIG. 4 illustrates a communications grid computing system including a variety of control and worker nodes, according to at least one embodiment.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
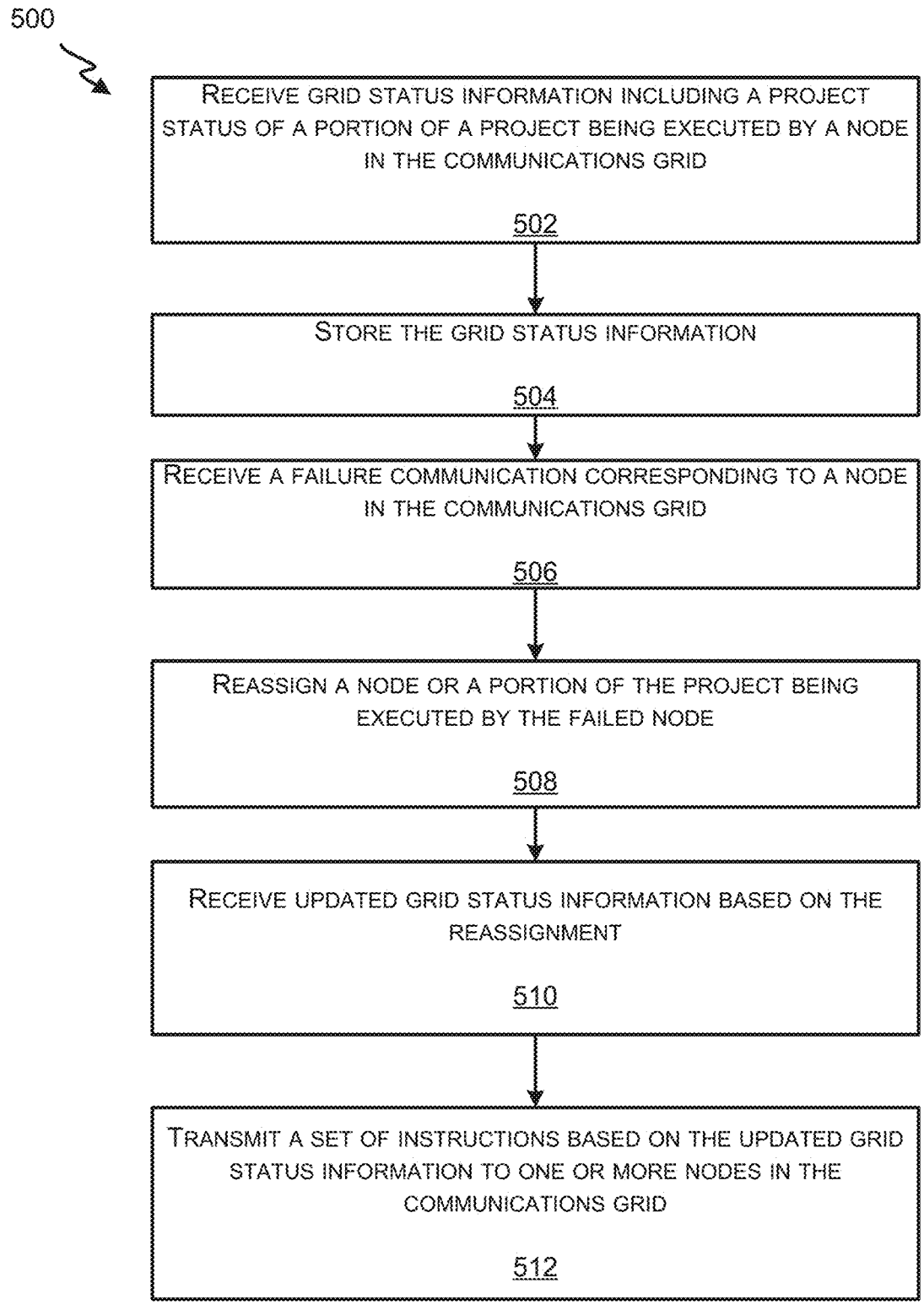
FIG. 5 illustrates a flow chart showing an example process for adjusting a communications grid or a work project in a communications grid after a failure of a node, according to at least one embodiment.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
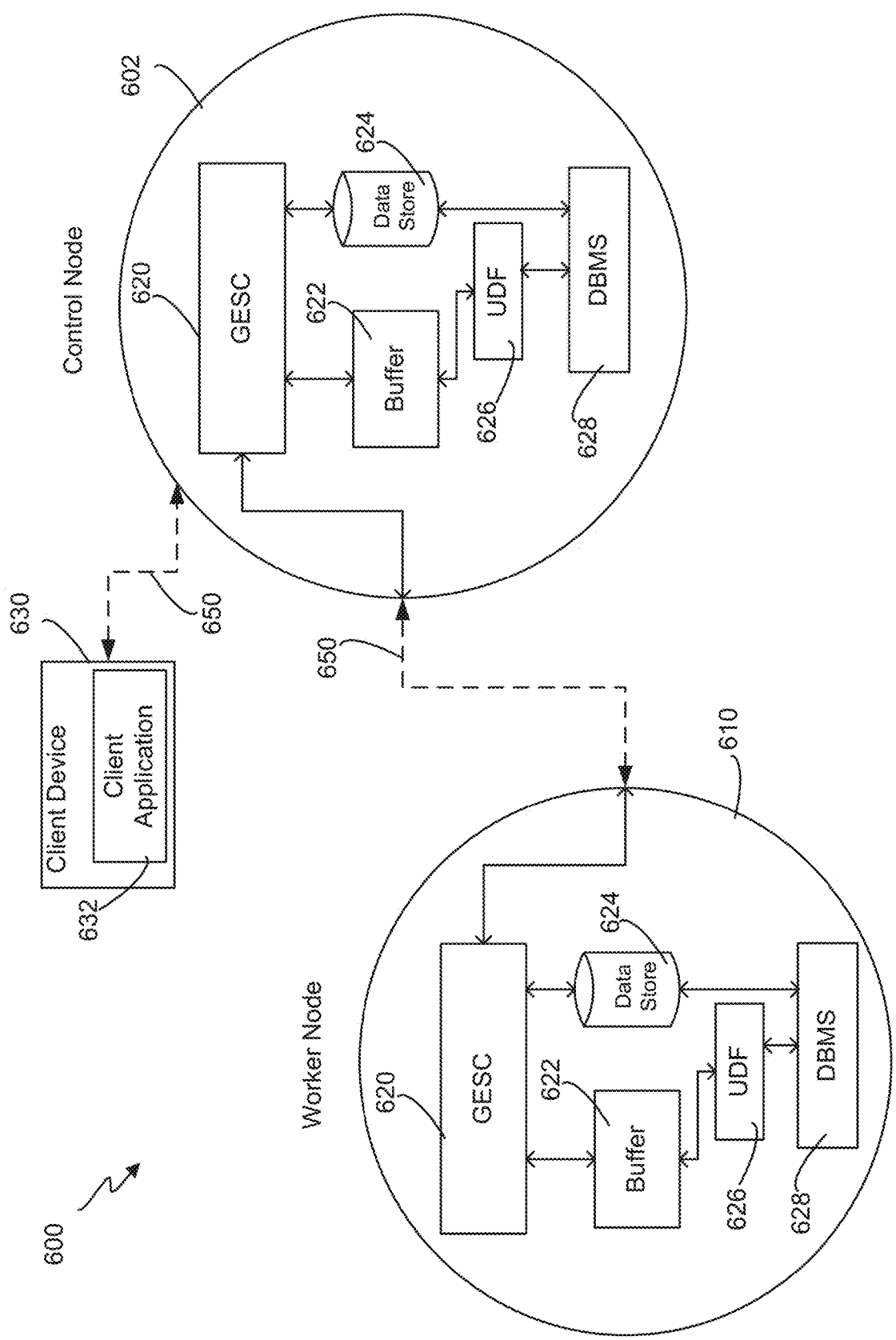
FIG. 6 illustrates a portion of a communications grid computing system including a control node and a worker node, according to at least one embodiment.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
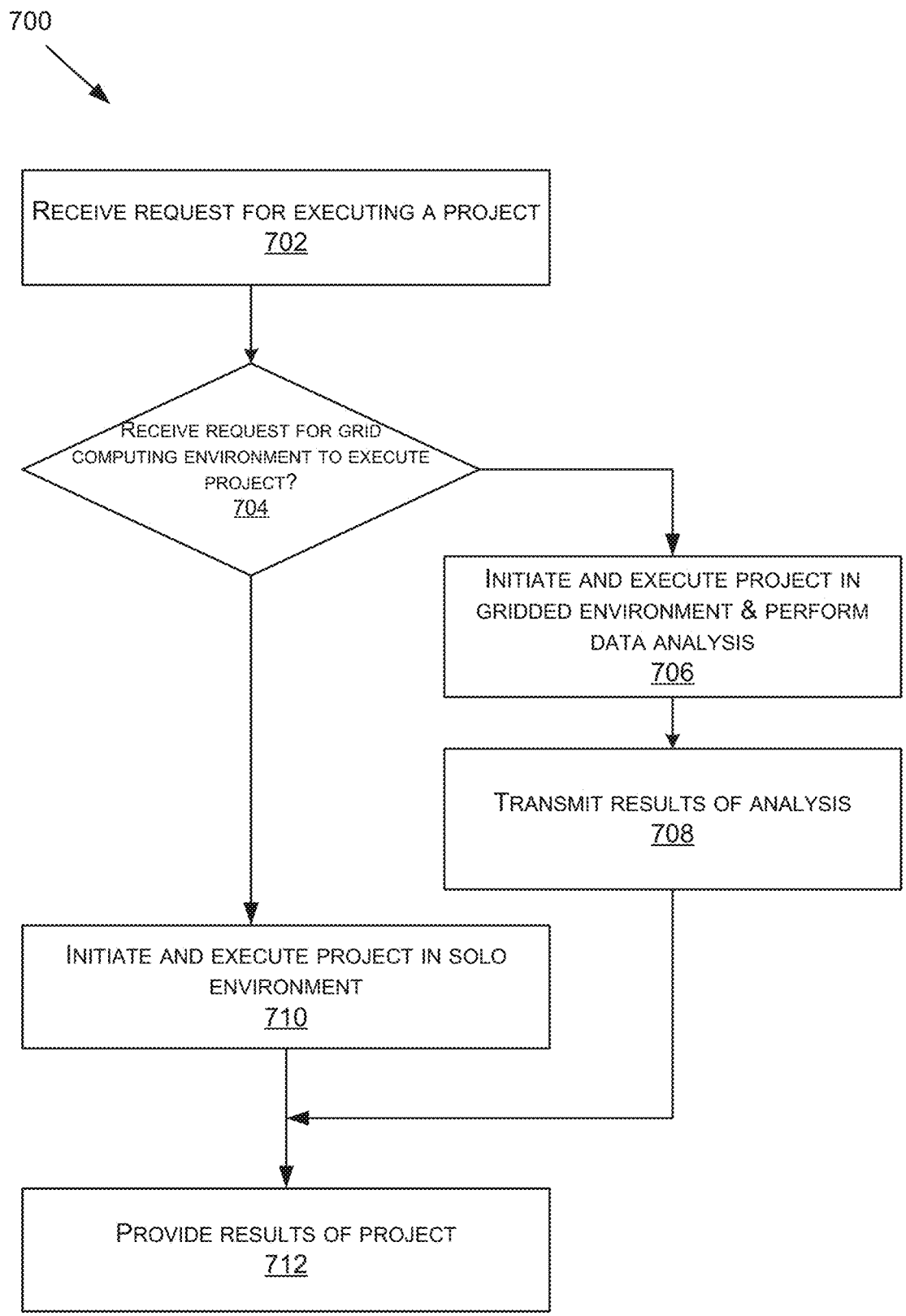
FIG. 7 illustrates a flow chart showing an example process for executing a data analysis or processing project, according to at least one embodiment.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
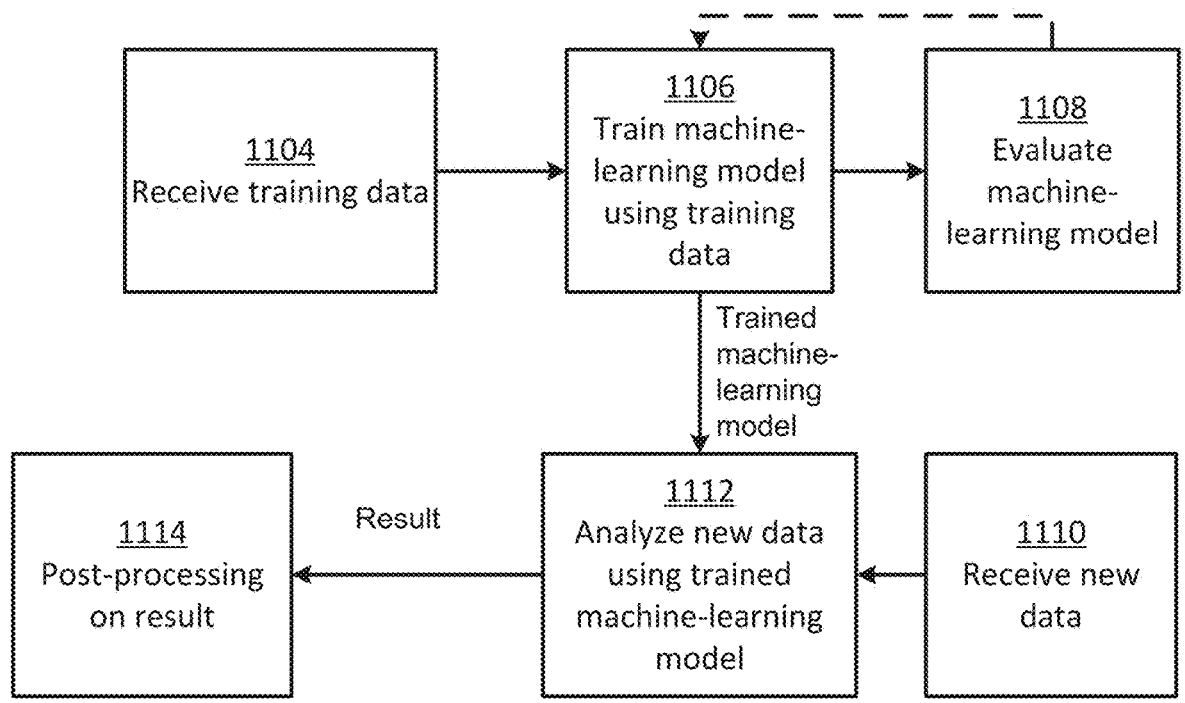
FIG. 11 illustrates a flow chart of an example of a process for generating and using a machine-learning model according to at least one embodiment.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
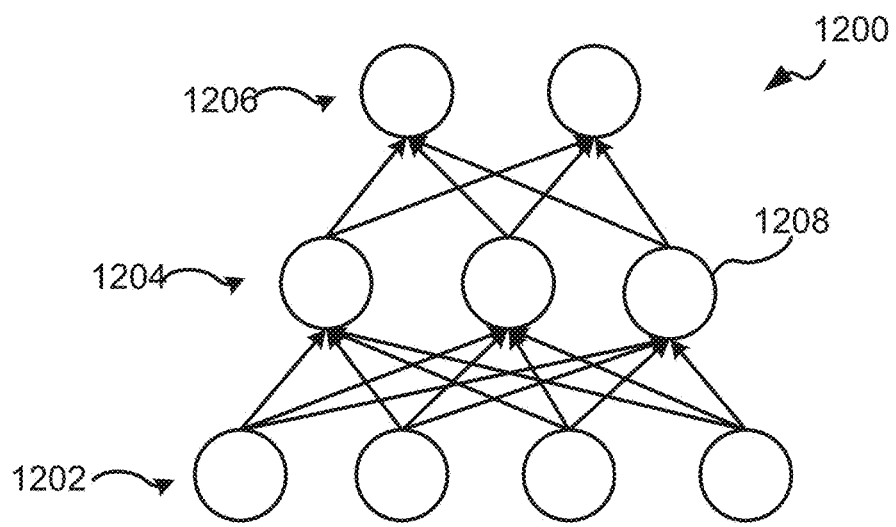
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training.

For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
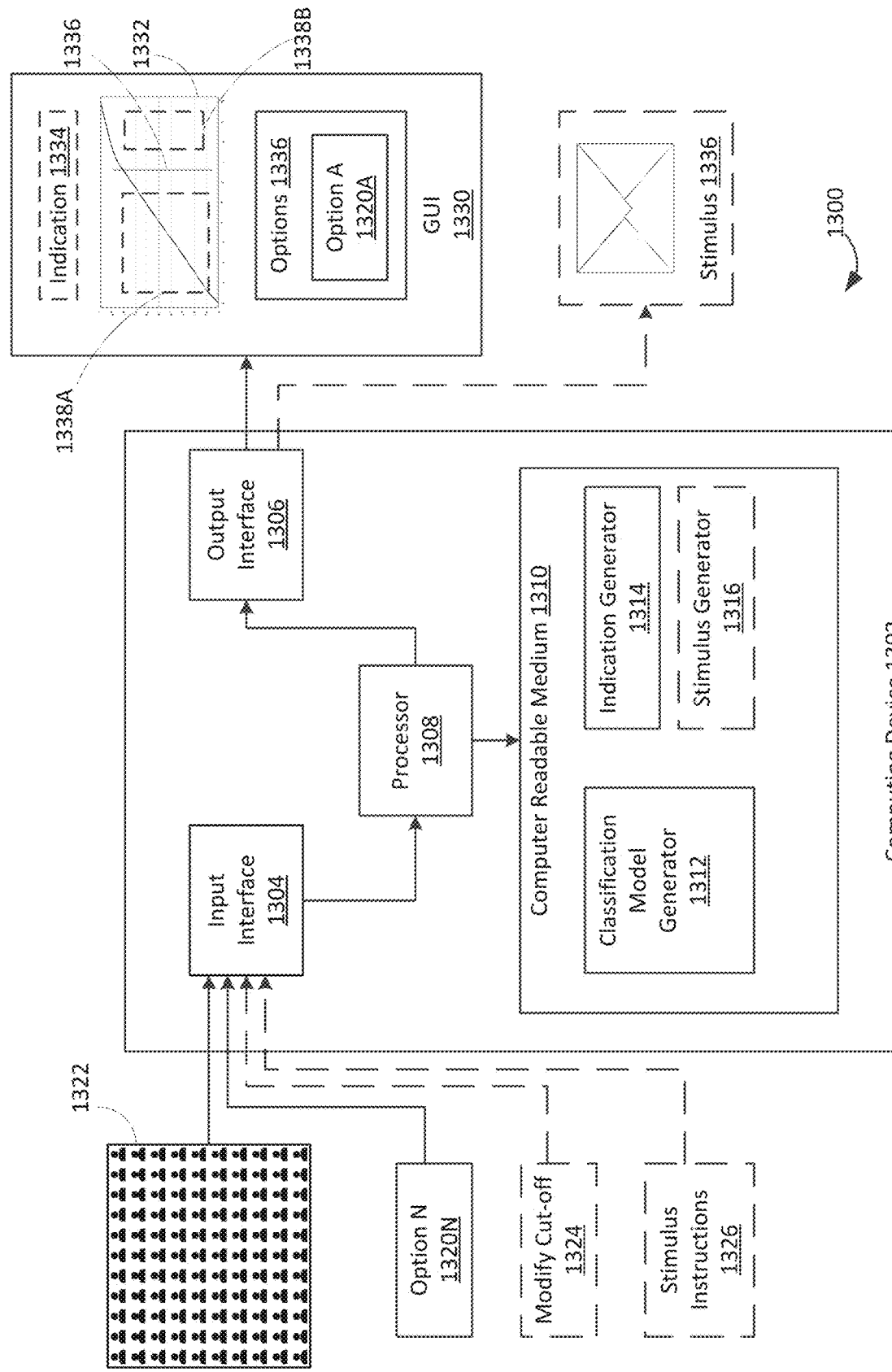
FIG. 13 illustrates an example of a block diagram of a system in at least one embodiment.

FIG. 13 illustrates a block diagram of a system 1300 in at least one embodiment. System 1300 includes a computing device 1302. In one or more embodiments, the system 1300 includes one or more input devices for receiving population information 1322 via one or more input interfaces 1304. For instance, population information includes population context (e.g., a campaign or study), user categories (e.g., sex or gender data for the population), and/or user results (e.g., response of uses exposed to a sample stimulus) for users of a sample population. The population information 1322 can be received from another computing system or can be manually input by a user of the system 1300 via an input device (e.g., a keyboard or touch screen for user entry of data). Additionally, the system 1300 includes one or more output devices (e.g. one or more display devices) for outputting via one or more output interfaces 1306 in a graphical user interface (GUI) 1330 a graphical representation 1332 of a model. For instance, a model includes classification or predictive models related to or derived from the population information 1322. One type of a classification model is a classification model that is used to classify or separate elements of a set into two groups. A classification model can be a predictive model in which one or more thresholds distinguish ranges of values where a behavior predicted by the model varies in some important way.

For instance, in the context of a campaign for a candidate for election, a campaigner can use a classification model to separate individuals of the voting population into a targeted group for providing a stimulus of campaign materials about the candidate and an excluded group for not providing campaign materials. A threshold in a classification model can be referred to as cut-off or a decision threshold to divide the population into at least two groups. Of course other types of classification model are possible, such as ones that divide a population into multiple groups with multiple cut-offs to divide the population into each of the groups. For instance, users could be divided into at least two target groups, one exposed to one type of stimulus and one exposed to another. For instance, applications users in the context of providing feedback on a website (e.g., a social media website) may be divided into three groups, a first target group who are predicted to provide feedback after receiving an application service, a second target group who are predicted to provide feedback after receiving an application service and prompting with an electronic prompting (e.g., an email request for feedback), and an excluded group who should not receive the service. In this case, there is overlap in the stimulus provided to each of the target groups. In other examples there is no overlap.

For simplicity, one or more examples herein are described with reference to a single cut-off (e.g., in a binary classification model that divides a population into two groups), but techniques are applicable to classification models with multiple cut-offs.

The system 1300 is configured to exchange information between devices in the system (e.g., via wired and/or wireless transmission). For example, a network (not shown) can connect one or more devices of system 1300 to one or more other devices of system 1300. Alternatively or additionally, the system is integrated into one device (e.g., a touch screen for entry of population information 1322 and display of graphical representation 1332).

The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input interface 1304, with output interface 1306 and with computer readable medium 1310) to receive, to send, and to process information.

In one or more embodiments, computer-readable medium 1310 stores instructions for execution by processor 1308. In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The applications can be written using one or more programming languages, assembly languages, scripting languages, etc. The one or more application can be integrated with other analytic tools. As an example, the classification model generator 1312, indication generator 1314, and/or stimulus generator 1316 are integrated data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 1310 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

For example, in one or more embodiments, the computer-readable medium 1310 comprises instructions for a classification model generator 1312 and indication generator 1314. The classification model generator 1312 determines or generates a classification model from the population information 1322. For instance, the population information includes data regarding results (e.g., consumer purchases, scientific data, measurements, scores) of exposing a sample population (e.g., potential consumers, devices, sensors) to a sample stimulus (e.g., an advertisement, electronic communication, environment). The classification model generator 1312 generates, based on the received data, a classification model providing prediction data indicating predicted users in a target population (e.g., a new set of potential consumers, devices, sensors) who will respond to a target stimulus (e.g., a new advertisement, electronic communication, environment) according to a predefined user response category (e.g., a category defined for classifying data results of users (e.g., scored data or measurements, classified sensed data).

A classification model is also referred to herein as simply a model. Users in a target population as described herein could include computer users, device users, social media users, computing devices, sensors, etc. who could potentially use or otherwise receive the target stimulus. A predefined user response category could be one of different possible expected responses or behaviors by users in a target population in response to the target stimulus (e.g., purchase the toy or not purchase the toy).

In one or more embodiments, the computing device 1302 displays in the GUI 1330, a graphical representation 1332 of the generated classification model generated by the classification model generator 1312. For instance, the graphical representation is a plot diagram and the graphical representation plots, according to the generated classification model, prediction data indicating predicted users in the target population who will respond to the target stimulus as a function of a variable number of users eligible to receive the target stimulus. A cut-off 1336 in the graphical representation graphically separates the variable number of users of the classification model into two regions, a first region 1338A that corresponds to target data for a target group to receive the target stimulus and a second region 1338B that corresponds to exclusion data for an excluded group to not receive the target stimulus.

Additionally, the computing device 1302 displays in the GUI 1330 a set of options 1336 each specifying one of different objectives for determining a proportion of users in the target population to expose to the target stimulus (e.g., by determining a location of the cut-off 1336 in the GUI 1330). The GUI 1330 in one or more embodiments displays various components of the GUI 1330 (e.g., the options 1336 and graphical representation 1332) on the same or different displays.

In one or more embodiments, selection of one or more of the set of options 1336 controls a location of the cut-off 1336 in the graphical representation 1332. For instance, one or more of the set of options 1336 accounts for different factors, metrics or tradeoffs in selecting a particular cut-off 1336. In one or more embodiments, each option includes the same or different factor or metric for increasing a number of targeted users who will respond to the target stimulus according to a predefined user response category and balances this factor or metric against another factor or metric. Factor or metrics considered for an option may be considered a tradeoff if gains in one factor or metric affect gains in another.

In one or more embodiments, the set of options 1336 includes a first option 1320A that indicates that the location of the cut-off accounts for a first factor for increasing a number of targeted users who will respond to the target stimulus according to a predefined user response category and a second factor related to a detriment of a user of the GUI from employing the target stimulus.

In one or more embodiments, the user of the GUI includes an individual or an organization that employs an individual to use the GUI. For example, the user of the GUI is related to a campaigner or campaign company using the computing device 1302 to convert members of the target population to vote for a candidate or purchase a product. Converts can refer to users in a target population that behave according to a preferred user defined response category (e.g., data indicating a user will vote for the candidate or purchase the product, data indicating measurements performed by a computing device or sensor). Non-converters can refer to users in a target population that behave according to non-preferred user defined response category (e.g., data indicating a user will not vote for the candidate or purchase the product, data indicating the computing device or sensor failed to perform measurements). In this context, the detriment of efforts to convert could be a financial cost (e.g., the cost of mailing out an advertisement as part of the campaign, the cost of placing a sensor in a particular environment like a certain altitude). Alternatively or additionally, the detriment includes an environmental cost to produce the target stimulus. Alternatively or additionally, the detriment includes a reputational detriment to produce the target stimulus.

In one or more embodiments, the first option 1320A accounts for tradeoffs in which the detriment to the user of the GUI is a tradeoff with the number of targeted users who will respond to the target stimulus (e.g., if more emails go out the number of users in the target population who convert likely will increase, but so will the detriment to the campaigner).

In one or more embodiments, the computing device 1302 receives via the one or more input interfaces 1304 a data input from the user of the GUI selecting a selected option 1320N of the set of options 1336. In one or more embodiments, a location of the cut-off 1336 in the graphical representation of the generated classification model is based on the selected option 1320N. In one or more embodiments, the system 1300 predicts or otherwise determines proportion data indicating the proportion of users in the target population to expose to the target stimulus based on the determined location of the cut-off 1336 (e.g., by displaying the cut-off 1336 dividing data representing the target population into a target group and an excluded group). Proportion of users include a number of users out of the target population, a number of groups of users (e.g., if the target population is divided into deciles or quantiles), a percentage of the target population, etc. Thus, one or more embodiments, a computing device 1302 advantageously outputs or displays goal-related options for the user of the GUI 1330 in regards to providing a stimulus to a target population that account for more than simply increasing the number of users in the target population that respond according to the predefined user response category.

In one or more embodiments, the computing device 1302 additionally receives via the one or more input interfaces 1304 a modify cut-off input 1324 (e.g., from the user of the GUI). This enables moving the cut-off 1336 from a location selected based on the selected option of the set of options 1336.

In one or more embodiments, the classification model generator 1312 works in cooperation with the indication generator 1314 to output information to the GUI 1330. For instance, the indication generator 1314 determines or generates an indication related to a classification model generated or determined by the classification model generator 1312. In one example, the indication generator 1314 issues one or more indications as to whether to use the classification model as a basis for exposing the predicted proportion of users in the target population to the target stimulus. For instance, the indication generator 1314 determines or generates a quality indication of the model quality of a classification model. Additionally, or alternatively the indication generator 1314 determines or generates features of the classification model.

The classification model generator 1312 and indication generator 1314 could be used to generate a classification model and one or more indications for many different target populations or sample stimulus. In an example, the sample population is a sample population of a campaign. The computing device 1302 receives via the one or more input interfaces 1304 campaign data regarding results of a campaign intended to convert members of the sample population to select a candidate person or product in response to a campaign approach (e.g. a mailed flyer). In one or more embodiments, a user response category is defined and tracked using various analytic software. Data regarding the sample population is received from the analytic software implemented by a computing device. For instance, the analytic software might be a web analytic software that tracks site flow, web traffic or views, application engagement by a user, software downloads, chat activity, user engagement and feedback, etc. The classification model generator 1312 generates a classification model predicting the proportion of users in the target population who will select a second candidate person or product in response to a target stimulus using the same or a related approach (e.g., a social media advertisement with the same content as the mailed flyer). Selection of a candidate person or product can be gaged by the analytic software (e.g., increased traffic to a product or candidate website). The indication generator 1314 issues one or more indications indicating whether to use the same or related campaign approach based on the classification model.

In one or more examples, the campaign approach involves chat window support to a user (e.g., a visitor active on a website). In one or more embodiments, the graphical user interface displays a prediction classification model predicting (1) which users are likely to accept the offer to interact with a live person via chat, and/or (2) which users are likely to reach the user's goal and thus the campaigners goal as a result of interacting with a live person. However, chat services are a limited resource given the limited number of live agents compared to the number of web site visitors and should be made available to those visitors more likely to respond positively to the interaction with the agent. One or more embodiments, provide a graphical user interface allowing a campaigner to select options related to a classification model and receive data on how to use a limited resource.

As another example, the sample population is a population of users comprising computing devices or sensors. A computing device or sensor may be in a non-deterministic system in which the computing device or sensor may have some degree of unpredictability in responding to a stimulus (e.g., performing an expected function or failing to perform an expected function). The response of devices or sensors of the population can be detected by one or more device, sensor or other measurement data. In one or more embodiments, the computing device 1302 receives via the one or more input interfaces 1304 measurement data regarding results of exposure of the sample population to a stimulus (e.g., a particular environment, a sequence of computing instructions, etc.). A classification model is generated predicting the proportion of users in a target population who will respond in a certain way to the stimulus (e.g., performing or failing to perform an expected function). This can be useful, for example, for determining how many computing devices or sensors to put in a particular environment or provide a computing task to generate a certain conversion of computing devices or sensors that will perform an expected function. In one or more embodiments, the computing device issues one or more indications indicating whether to use a stimulus based on a classification model.

In another example, the sample population is users participating in a medical study whose progress or improvement in health in response to a medical treatment is tracked, for instance, by clinical trial software and/or biotrackers. In such a scenario, the computing device 1302 receives via the one or more input interfaces 1304 medical data regarding the results of the medical study to observe improvement to a health of individual users of the sample population treated with a medical treatment. For instance, in one or more embodiments, the medical data is received from a biotracker or output from a computing device comprising clinical trial software. The classification model generator 1312 generates, a classification model predicting the proportion of users in a target population (e.g., a new clinical trial) whose health will improve in response to the target stimulus that is based on a same or similar medical treatment. The indication generator 1314 issues one or more indications indicating whether to administer the same or similar medical treatment based on the classification model.

In yet another example, the sample population comprises a category of people exposed to a sample stimulus (e.g., an environment factor for an environment for the people). For example the category of people could be customers or employees. An environment factor for an employee could be, for example, an employment environment factor (e.g., workplace flexibility, hours of employment, office snacks, etc.). An environment factor for a customer could be, for example, a store environment factor (e.g., store lighting) or website environment factor (e.g. website background). In such a scenario, the computing device 1302 receives via the one or more input interfaces 1304 attrition data regarding attrition rates of a sample population comprising a category of people exposed to a sample stimulus that is an environment factor for an environment for the people. The classification model generator 1312 generates, a classification model predicting the proportion of users in the target population who will leave or stay in the environment for the people in response to the target stimulus that is based on the environment factor (e.g., as indicated by employee or customer retention data). The indication generator 1314 issues one or more indications indicating whether to employ the target stimulus based on the classification model.

In one or more embodiments, the users of the target population include an entirely new set of users different from users of the sample population. Alternatively or additionally, the users of the target population are the same or have only some overlap with users in the sample population. Further, results of exposing the target population to a stimulus could be fed back into the computing device as sample population information for predicting a second target population's response to a stimulus.

In one or more embodiments, the computer readable medium 1310 also includes a stimulus generator 1316 for generating the stimulus. For instance, the one or more input interfaces 1304 could be used to receive a stimulus instruction 1326. For example, in response to the one or more indications 1334 as to whether to use the classification model as a basis for exposing the predicted proportion of users in the target population to the target stimulus, the computing device 1302 receives input from the user of the GUI indicating to employ the target stimulus (e.g., to send an email as part of a campaign). The stimulus generator 1316 generates the target stimulus (e.g., generates an electronic communication) in response to the input indicating to employ the target stimulus. In one or more embodiments, the computing device 1302 disseminates the generated target stimulus 1336 to the target group. For example, the computing device 1302 via the one or more output interfaces 1306 sends the generated target stimulus 1336 (e.g., sending an email or computer instructions for a computing task to the identified proportion of the target population).

In one or more embodiments, fewer, different, and additional components can be incorporated into computing device 1302. For instance, in one or more embodiments, there are multiple input devices or computing systems (e.g., one to input the population information 1322 and another to input the option 1320). In the same or different embodiments, there are multiple output devices or computing systems (e.g., one to display the GUI 1330 and one to disseminate a generated target stimulus 1336).

As another example, the same interface supports both input interface 1304 and output interface 1306. For example, a touch screen provides a mechanism for user input and for presentation of output to the user. Alternatively, the input interface 1304 has more than one input interface that uses the same or different interface technology. Alternatively or additionally, the output interface 1306 has more than one output interface that uses the same or different interface technology.

In one or more embodiments, the system 1300 implements a method as described herein (e.g., a method shown in FIG. 14) for issuing one or more indications as to whether to use the classification model, displayed in a graphical representation 1332 in the GUI 1330, as a basis for exposing the predicted proportion of users in the target population to the target stimulus.

Figure 14A:
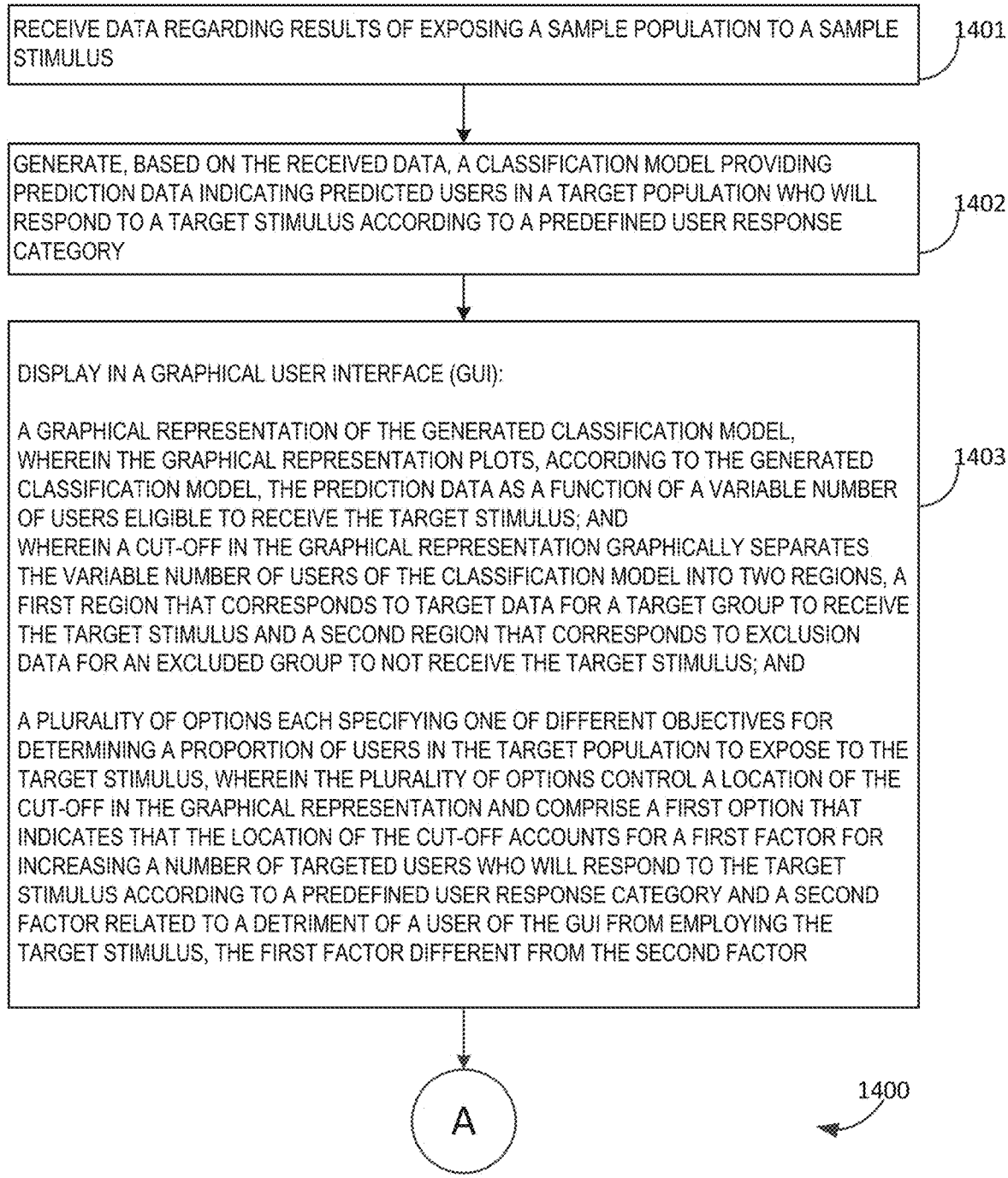
FIGS. 14A and 14B illustrate an example of a flow diagram in at least one embodiment.
Figure 14B:
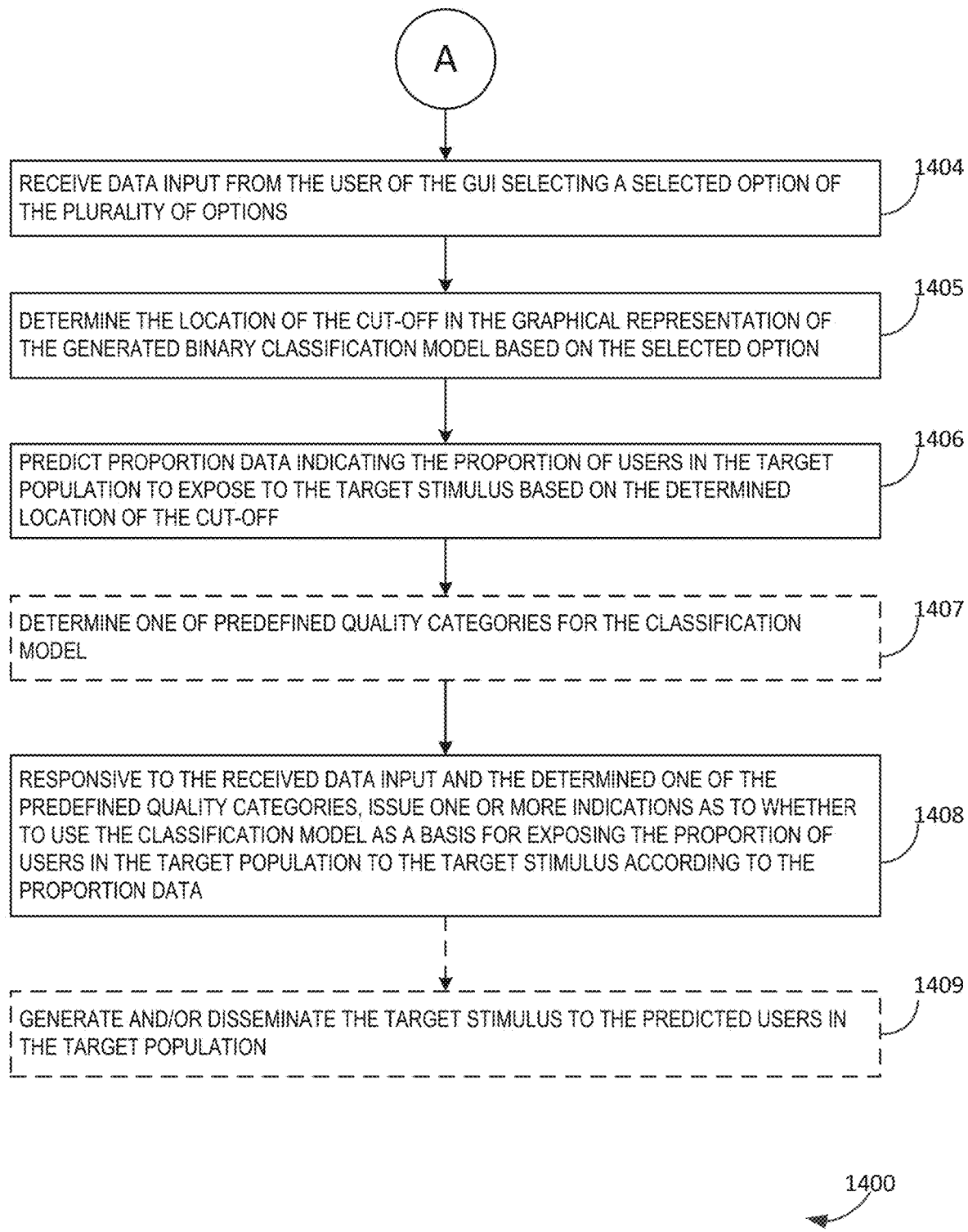

FIGS. 14A-14B illustrate a flow diagram for a computer-implemented method 1400 that can be used to issue one or more indications as to whether to use the classification model, displayed in a graphical representation 1332 in the GUI 1330, as a basis for exposing a proportion of users in the target population to the target stimulus. In one or more embodiments, the method is implemented by one or more entities of a system 1300 described herein.

In a first operation 1401 of FIG. 14A, the method 1400 includes receiving data regarding results of exposing a sample population to a sample stimulus (e.g., population information 1322). For instance, the data could be computer data indicating characteristics of users of the sample population (e.g., gender, age, machine type) and how users of various categories responded in response to a sample stimulus. As one example, 85 percent of women customers purchased a toy in response to an advertisement, whereas on 35 percent of men customers. As another example, the data could be the importance of various characteristics of users of the sample population (e.g., a ranking or importance metric assigned for predicting likelihood of a particular defined user category affecting response to a stimulus). As one example, the customer gender could be assigned an importance factor of 1, customer lifetime value (CLV) could be assigned an importance factor of 0.573, and customer age could be assigned an importance value of 0.125.

In a second operation 1402, the method 1400 includes generating, based on the received data, a classification model providing prediction data indicating predicted users in a target population who will respond to a target stimulus according to a predefined user response category (e.g., by the classification model generator 1312).

In one or more embodiments, generating the classification model could include obtaining sample characteristics of users of the sample population and obtaining target characteristics of users in the target population (e.g., defined user categories like gender or age). This is particularly useful for extrapolating results from a set of users in a sample population to a set that includes new users in the target population. A computing device determines associations by associating respective ones of the sample characteristics with certain behaviors in the sample population in response to the sample stimulus. Generating the classification model could further involve determining, based on the determined associations, a likelihood of a particular characteristic of the target characteristics of users in the target population correlating with responding to the target stimulus according to the predefined user response category to the target stimulus. The computing device generates the classification model by arranging the users in the target population in the classification model based on the determined likelihood.

In an operation 1403, the method 1400 includes displaying a graphical representation (e.g., graphical representation 1332) and a set of options (e.g., options 1336) in a GUI.

In one or more embodiments, the graphical representation plots, according to the generated classification model, prediction data indicating predicted users in the target population who will respond to the target stimulus according to the predefined user response category as a function of a variable number of users eligible to receive the target stimulus. A cut-off (e.g., cut-off 1336) in the graphical representation graphically separates the variable number of users of the classification model into at least two regions (e.g., by providing a divider line between the two regions). A first region (1338A) of the two regions corresponds to target data for a target group to receive the target stimulus and a second region (1338B) of the two regions corresponds to exclusion data for an excluded group who will not receive the target stimulus. The two regions are shown on the particular side of the cut-off 1336 merely for illustration. One of ordinary skill in the art will appreciate that in other embodiments the two regions are divided differently (e.g., the excluded group data is in first region 1338A and the target group data is in second region 1338B). The plurality of options each specify one of different objectives for determining a proportion of users in the target population to expose to the target stimulus as described herein. The plurality of options control a location of the cut-off in the graphical representation. For example, a first option indicates that the location of the cut-off accounts for a first factor for increasing a number of targeted users who will respond to the target stimulus according to a predefined user response category and a second factor related to a detriment of a user of the GUI from employing the target stimulus. The first factor is different from the second factor.

In an operation 1404 shown in FIG. 14B, the method 1400 includes receiving data input from the user of the GUI selecting a selected option of the plurality of options. For instance, the user interacts with the GUI to select the first option and the GUI displays the selected option.

In an operation 1405, the method 1400 includes determining the location of the cut-off in the graphical representation of the generated classification model based on the selected option.

In an operation 1406, the method 1400 includes predicting or otherwise determining or computing proportion data indicating the proportion of users in the target population to expose to the target stimulus based on the determined location of the cut-off.

In an operation 1407, the method 1400 includes determining one of predefined quality categories for the classification model. There are many metrics and approaches for evaluating the quality of a predictive model (e.g., a cumulative gains chart, a model Gini index, and values of a confusion matrix as described in more detail herein). The predefined quality categories could correspond to one or more of metrics or approaches for evaluating the quality of a predictive model. Determining one of predefined quality categories in one or more embodiments includes determining a multiple model quality metrics for the predictive value of the classification model and generating quality data indicating the multiple model quality metrics. Each model quality metric is based on a different approach for evaluating the quality of the predictive value of the classification model. In one or more embodiments the determining one of predefined quality categories for the classification model is based on determining the location of the cut-off in operation 1405.

In an operation 1408, the method 1400 includes, responsive to the received data input and/or the determined one of the predefined quality categories, issuing one or more indications as to whether to use the classification model as a basis for exposing the proportion of users in the target population to the target stimulus according to the proportion data.

In one or more embodiments, the one or more indications include displaying a divider at the determined location of the cut-off. The divider visually divides users represented in the graphical representation of the generated classification model as eligible to receive the target stimulus. The display of the divider can be an indication to the user of the GUI that the model is ready for use as a basis for employing a target stimulus. Further, various characteristics of model quality can be associated with this divider or displayed in proximity with this divider (e.g., a conversion rate or lift as described in more detail herein) to indicate to the user of the graphical user whether to use the classification model as a basis for exposing the predicted proportion of users in the target population to the target stimulus.

In one or more embodiments, the issuing of one or more indications includes generating and issuing a quality indication of model quality. For instance, the quality indication is an icon corresponding to a determined one of the predefined quality categories for the classification model. The icon is then displayed in the GUI in connection to the graphical representation of the classification model.

In the case where the predefined quality categories correspond to different metrics or approaches for evaluating the quality of a predictive model, the icon can represent the different model quality metrics or approaches holistically (e.g., different feature of states of an icon). Alternatively or additionally, multiple icons could be displayed to represent individual model quality metrics or sets of model quality metrics.

In one or more embodiments, the method 1400 optionally includes an operation 1409 for generating and/or dissemination the target stimulus to the predicted users in the target population. For instance, the computing device can generate an email and send the email to users in the target group of the target population. In one or more embodiments, the operation 1409 is responsive to data input from the user of the GUI and/or computing device (e.g., an indication for the computing device to disseminate the target stimulus).

Figure 15:
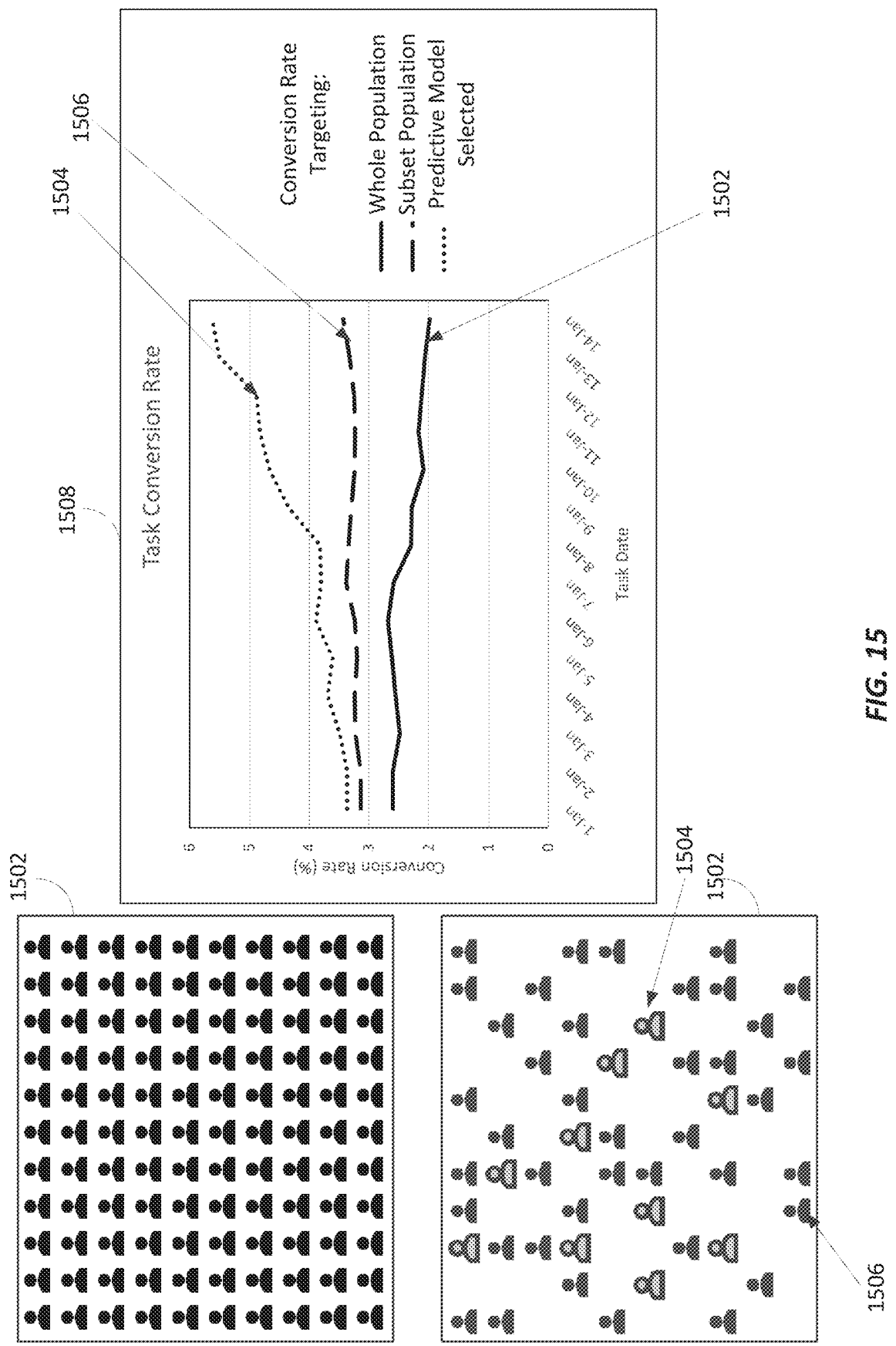
FIG. 15 illustrates an example of a target population and a target group in at least one embodiment.

FIG. 15 illustrates a target population 1502 and a target group 1504 in at least one embodiment. FIG. 15 shows a task conversion rate chart 1508 for various tasks (i.e. exposure to target stimulus as defined herein) performed on users of a target population 1502 in the first two weeks of a month. For example, on a first day the users receive an email, on a second day, the users receive an application message on a mobile device, on a third day, a message is displayed on a website, or some combination on any given day. Conversion as used herein refers to users (i.e., converters) responding according to a predefined user response category preferred by the user of the GUI. For instance, if the application is a campaign for purchasing a product, conversion would refer to users who purchased the product. Alternatively, if the application is a health study to test a blood pressure medicine, conversion would refer, for instance, to users whose blood pressure lowered in response to the blood pressure medicine as indicated by data of a biotracker. Alternatively if the application is a study of oil for jet engine, conversion would refer, for instance, to jet engines who lasted a certain period of time before failure.

The task conversion rate chart 1508 illustrates example benefits of using one or more system, devices or methods described herein. As shown in the results in chart 1508 for the entire target population 1502 exposed to target stimulus, the conversion rate would eventually decline. For instance, those must likely to purchase the product would do so early in response to the stimulus.

Chart 1508 shows conversion rates for a subset 1506 of the target population 1502 if a subset of the population where instead exposed to the target stimulus based on some selected tools to identify users more likely to convert. As expected chart 1508 shows slightly better conversion rate for the subset 1506 than the results of exposing the entire target population 1502 to the target stimulus.

However, using a classification model with a cut-off selected herein, a targeted group 1504 of the target population 1502 can be selected according to the classification model displayed in the GUI and exposed to the target stimulus increasing conversion rate for targeted group 1504.

Further as shown in FIG. 15, in one or more embodiments, each use of a classification model (e.g., each day) the information regarding the target population becomes a part of information regarding the sample population for a classification model for an individual stimulus task. In this way the classification model with a cut-off selected herein improves, improving the conversion rate as shown in chart 1508. For example, in one or more embodiments, a computing device receives information regarding results of exposing one or more users in the target population to the target stimulus and updates, based on the received information, the classification model displayed in the GUI. The computing device can then issue an indication indicating a change in quality of the classification model or location of the cut-off that accounts for the received information.

Figure 16:
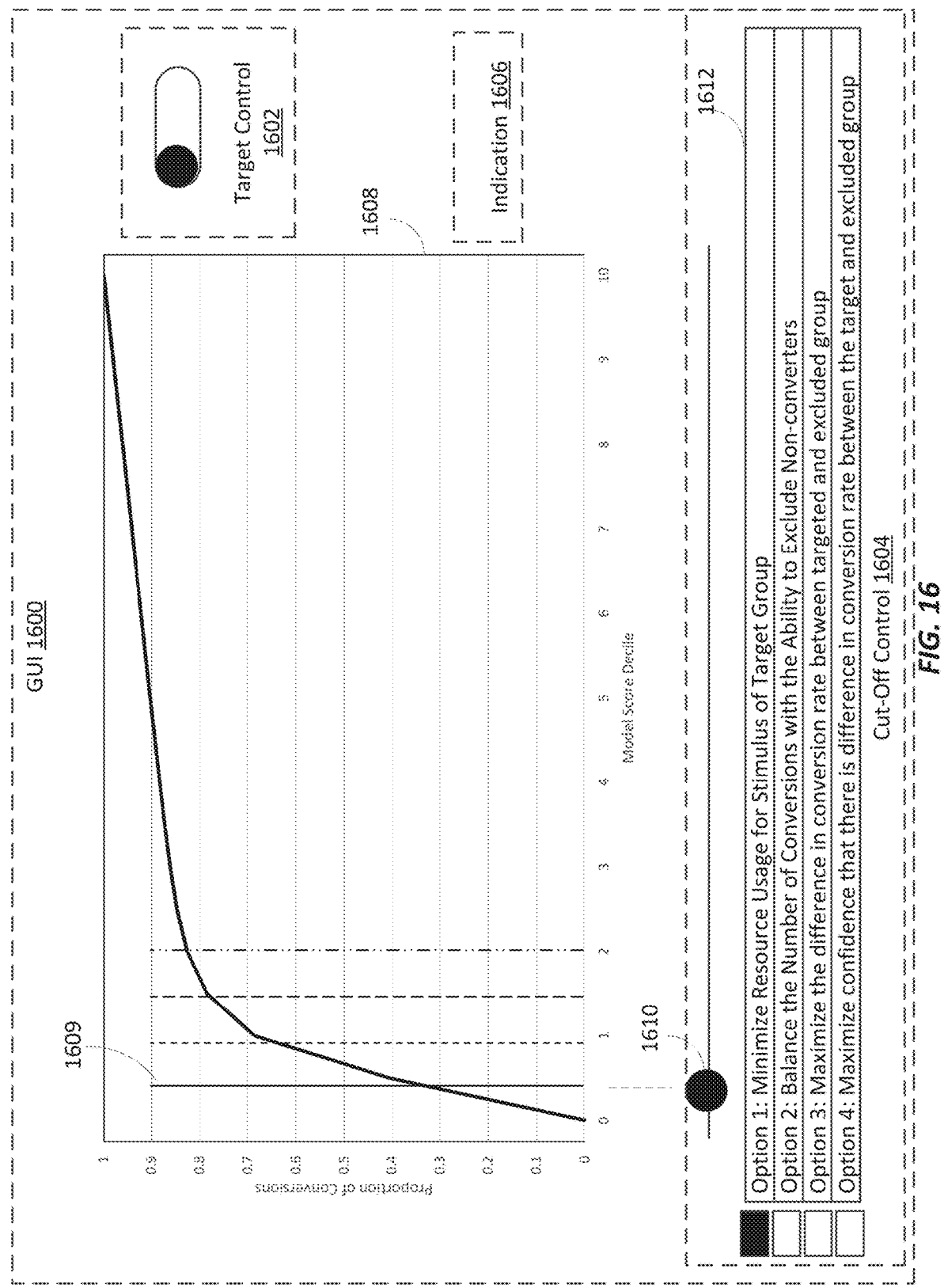
FIG. 16 illustrates an example of a graphical user interface in at least one embodiment.

FIG. 16 shows an example GUI 1660 in at least one embodiment. The GUI 1660 displays a graphical representation 1608 of a classification model and a set of options 1612 for selecting a cut-off. The set of options 1612 is part of cut-off control 1604. As shown, the classification model in graphical representation 1608 has a curve plotting the target population arranged in deciles to proportion of conversions. This example uses deciles to distribute the target population into 10 groups. More or less groups could be used (e.g., quantiles that would divide the target population into 4 groups). Alternatively, the proportion of the target population could be expressed in other ways (e.g., a percentage or decimal).

A set of dividers representing possible cut-offs are displayed on the graphical representation 1608. Each of the options of the set of options 1612 corresponds with one of the displayed dividers in the graphical representation 1608. Thus, each of the options can be said to correspond to a cut-off-off score.

As shown there are four model cut-off scores computed to generate the four different displayed dividers. One of ordinary skill in the art will appreciate more or less model cut-off scores could be computed. Each score in the example of FIG. 16 emphasizes a different goal when selecting a cut-off score. Offering the user of the GUI 1660 a choice of cut-off scores allows the user to adjust the cut-off score to a purpose or goal of the user (e.g., the purpose of a campaign). Thus, different options can be expressed in terms of goals for the user of the GUI.

In a first option of the set of options 1612, the option specifies to the user of the GUI an option to minimize resource usage for stimulus of target group. Thus, it is an example of first option 1320A. If this option is selected, the cost of delivering the stimulus (e.g., treatment) is high enough that the user is willing to give up conversions to minimize non-conversions. Typically, this cut-off score will be lower than the other 3 cut-off scores. In one embodiment, this cut-off score is computed as a function of a positive predictive value (PPV) and negative predictive value (NPV). PPV is the proportion of converters among the users in the targeted group. In some scenarios, the user of the GUI wants to choose a cut-off score with a high PPV because a higher proportion of converters among the targeted group results in more conversions. NPV is the proportion of non-converters among the users in the excluded group. The user of the GUI wants to choose a cut-off score with a high NPV because a higher proportion of non-converters among the excluded group results in fewer lost conversions. In one or more embodiments, the cut-off score is computed as a function of a PPV and NPV by computing a maximum of a PPV and NPV. PPV and NPV are inversely proportional. Choosing the maximum of the sum of PPV and NPV gives the user of the GUI a cut-off score balancing a high PPV and high NPV cut-off score.

In a second option of the set of options 1612, the option specifies to the user of the GUI an option to balance the number of conversions with the ability to exclude non-converters. In one or more embodiments, if this option is selected, a computing device (e.g., computing device 1302) computes a factor or metric to determine a benefit of increasing excluded users who will not respond to a target stimulus according to the predefined user response category and a factor or metric for increasing a number of targeted users who will respond to the target stimulus according to a predefined user response category. For example, this cut-off score is calculated as a function of a computed sensitivity and/or specificity (e.g., a maximum of the sum of sensitivity and specificity). Sensitivity is the proportion of converters in a target group of the target population to all converters. In some scenarios, the user of the GUI 1600 wants to choose a cut-off score with a high sensitivity because this means the targeted group contains a higher percentage of the converters. Specificity is the proportion of non-converters in an excluded group of the target population to all non-converters. In some scenarios, the user of the GUI 1600 wants to choose a cut-off score with high specificity because this means a higher percentage of non-converters are excluded from the campaign. Sensitivity and specificity are inversely proportional.

In a third option of the set of options 1612, the option specifies to the user of the GUI an option to maximize the difference in conversion rate between a targeted group and an excluded group (e.g., by computing a maximum lift as described in more detail below). Typically, this cut-off score will be higher than all other cut-off scores. For instance, in one embodiment a computing device (e.g., computing device 1302) computes a first metric to obtain a conversion rate of excluded users predicted to respond to the target stimulus according to the predefined user response if exposed to the target stimulus; and computes a second metric to obtain a conversion rate of targeted users predicted to respond with the predefined user response to the target stimulus if exposed to the target stimulus. The displayed second option of the set of options 1612 accounts for the first metric and the second metric.

For instance in one or more embodiments, the computing device determines a maximum conversion rate lift (lift), where lift is calculated according to equation (1).

$$\text{Lift} = \frac{\text{Conversion Rate of Target Group} - \text{Conversion Rate of Excluded Group}}{\text{Conversion Rate of Excluded Group}} \quad (1)$$

In a fourth option of the set of options 1612, the option specifies to the user of the GUI an option to maximize confidence that there is difference in conversion rate between the target and excluded group. For instance, this option is selected if the user does not have a particular goal or other reason to choose a particular cut-off score and wants the most confidence there is a difference in conversion rate between the targeted and excluded groups. This cut-off score can be computed using a number of statistical approach (e.g., a Decision Tree Split can be used to determine the cut-off score). For example, SAS/STAT® provides a Chi-square splitting criterion in PROC HPSPLIT.

In the example shown in FIG. 16, option 1 is selected by the user and the cut-off 1609 is displayed as a solid line divider halfway between the 0 and 1 decile. As shown the other cut-off options can be displayed if a different option is selected. Alternatively, as shown the other cut-off options can be displayed in the graphical representation 1608 in addition to the selected cut-off distinguished from the selected cut-off 1609 (e.g., by dotted lines). In this way the user can visually see how different a selected cut-off is from other cut-offs. This can be useful for the user of the GUI to manipulate the selected cut-off (e.g., to move a generated cut-off closer to another cut-off).

A slider 1610 provides the user of the GUI with a tool to manually adjust the selected cut-off 1609 to a different point (e.g., a particular decile). For instance, the user may wish to move the cut-off closer to other cut-off options. In one or more embodiments, a computing device (e.g., computing device 1302) receives user input adjusting the location of the cut-off displayed in the classification model (e.g., via slider 1610). The computing device updates the display of the classification model in a GUI (e.g. GUI 1600) to display an updated location for the cut-off.

One of ordinary skill in the art will appreciate other display tools for manually adjusting the selected cut-off 1609 (e.g., a text box for entering a decile for the cut-off 1609).

The GUI 1600 can display other tools related to the graphical representation 1608. One example of a tool is a target control 1602 that in one or more embodiments controls features of the display of the graphical representation. Target Control 1602 is shown as a slider for toggling between two states. However, other control displays are possible (e.g., a text box or option choices for more states).

In one embodiment, the target control 1602 allows a user of the GUI 1600 to select whether to allow a computing device to automatically select the selected cut-off 1609 based on or otherwise responsive to new information (e.g., a new option selection or updated target information). If the user is opting for manual control of the cut-off, the user may not want the cut-off to change even though the user wants other aspects of the model to update with new information.

Additionally, or alternatively a target control 1602 in one or more embodiments controls dissemination of the stimulus (e.g., stimulus 1336) to a target population as described herein (e.g., sending an email, posting a social media post, etc.). For instance, in one position, the target control 1602 alerts a computing device to disseminate stimulus (e.g., on a predefined schedule). In another position, no stimulus will be disseminated.

Another example of a tool, is an indication 1606, as described herein, indicating whether to use the classification model as a basis for exposing the predicted proportion of users in the target population to the target stimulus. For instance, the indication 1606 indicates a quality of the classification model in the graphical representation 1608.

In one or more embodiments, the GUI 1600 provides a way for a user of a GUI (e.g., a campaigner, an experimenter) to interact with a classification model whose purpose is to select users for inclusion to some kind of stimulus (e.g., a campaign, a study, etc.). For instance, the model in one or more embodiments estimates the probability of a person achieving the campaign's goal, or "converting". Typically, the user of the GUI would include users with a higher probability of converting in the campaign or study and exclude users with a lower probability. Separating the 'higher' from 'lower' requires understanding the model's quality, the distribution of cut-off scores, the trade-offs inherent in setting a cut-off point to separate the users included from the users excluded, etc.

In one or more embodiments, GUI 1600 herein supports the user of the GUI 1600 as a decision maker by visualizing model quality metrics (e.g., indication 1606) in a manner understandable and actionable by a user (e.g., via target control 1602, slider 1610, or set of options 1612). The user need not have any experience in predictive modeling to interact with the GUI 1600. Further the GUI 1600 supports the user by automatically setting a cut-off score based on the user's goals, allowing the user to understand the trade-offs necessary when changing the cut-off score (e.g., by displaying current and alternative model cut-off scores and displaying the effect of changing the model cut-off score).

In one or more embodiments, the computing device 1302 computes a positive predictive value (PPV), a negative predictive value (NPV), a specificity or a sensitivity to determine the location of a cut-off or to determine a quality metric for indicating a quality of the classification model to the user.

The term positive predictive value in statistics correlates with a proportion of positive cases that are correctly identified by a model. The term negative predictive value in statistics correlates with a proportion of negative cases that are correctly identified by a model. For instance, a plurality of predefined user response categories can be defined with one identified as a positive predefined user response category (e.g., a user clicking on an electronic link to a website offering information about a product) and one identified as a negative predefined user response category (e.g., a user not clicking on an electronic link to a website offering information about a product). Accuracy is a statistical term referring to the proportion of the total number of predictions that were correct (e.g., either positively or negatively).

Sensitivity also called recall in statistics correlates with the proportion of actual positive cases which are correctly identified. Specificity in statistics correlates with the proportion of actual negative cases which are correctly identified.

PPV, NPV, sensitivity and specificity can be used to measure the model's predication versus actual results on a target population. Sensitivity and specificity can also be used to determine the quality or applicability of a model to a certain applications. For instance, in the context of a pharmaceutical company, a user of the GUI may be more concerned with minimal wrong positive diagnosis. Hence, the user will be more concerned about high specificity. A model with a high specificity would be considered a better or higher quality model for the pharmaceutical application. On the other hand, an attrition model will be more concerned with high sensitivity. A model with a high sensitivity would be considered a better or higher quality model for the attrition application.

A confusion matrix is shown in the Table 1 below showing the relationship of PPV, NPV, Sensitivity and Specificity to predicted positive and negative outcomes of a model (e.g., a classification model) and target positive and negative outcomes.

TABLE 1

|  | Target Positive | Target Negative | |
|---|---|---|---|
| Model Positive | a | b | PPV = a/(a + b) |
| Model Negative | c | d | NPV = d/(c + d) |
|  | Sensitivity = a/(a + c) | Specificity = d/(b + d) | Accuracy = (a + d)/(a + b + c + d) |

Figure 17:
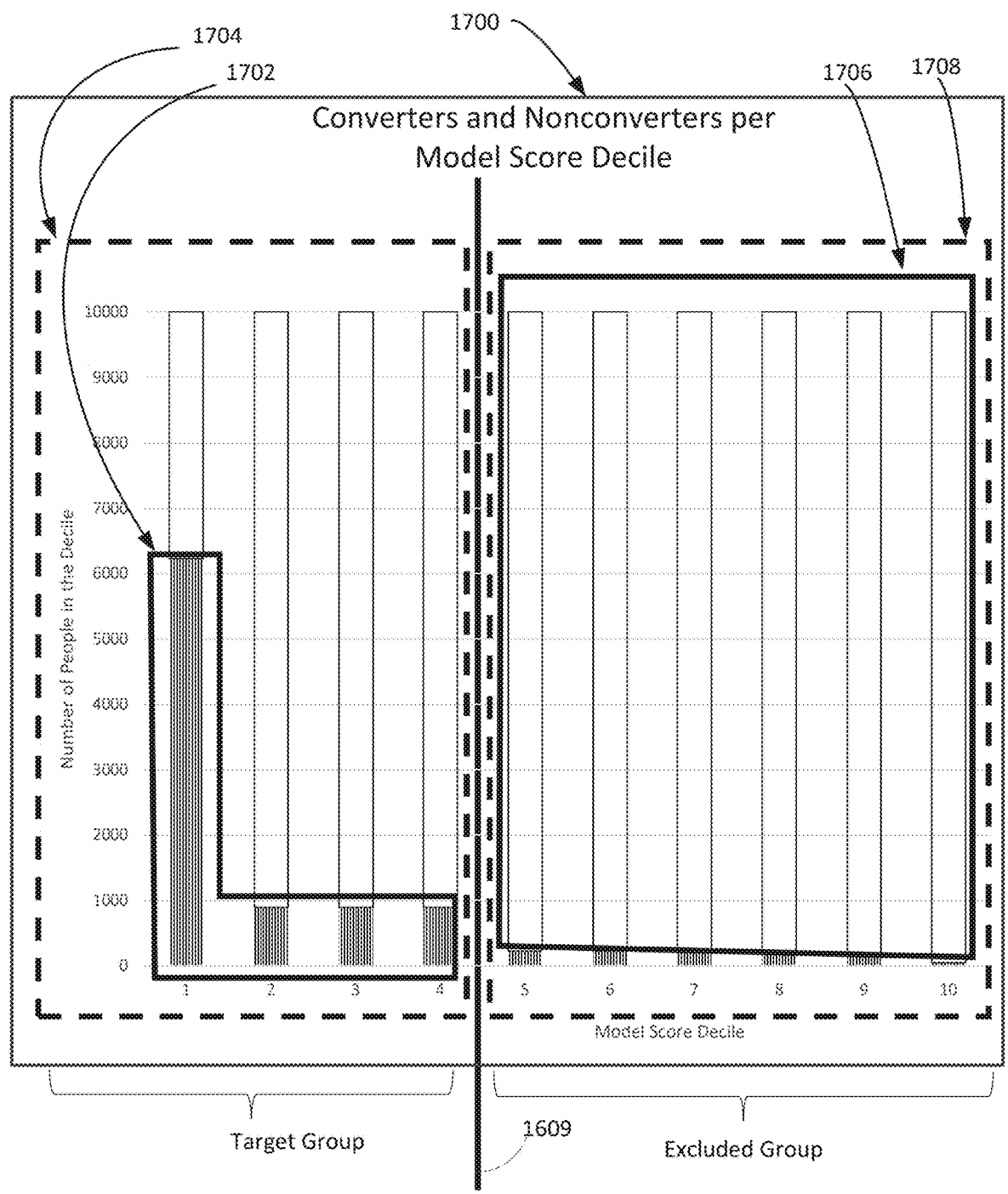
FIG. 17 illustrates an example with data for computing metrics related to a classification model in at least one embodiment.

FIG. 17 illustrates data for computing metrics related to a classification model in at least one embodiment. In particular, FIG. 17 illustrates data for computing a positive predictive value (PPV) and a negative predictive value (NPV) for a classification model in at least one embodiment. In one or more embodiments, a computing device (e.g., a computing device 1302) selects a location of a selected cut-off 1607 for a classification model based on computing a PPV and/or an NPV (e.g., in addition to, in response to, or alternatively with user input selecting an option for determining a location of a cut-off). The location of the selected cut-off 1609 identifies an excluded group 1708 and a target group 1704 of users of the target population.

FIG. 17 shows a bar graph 1700 of predicted non-converters (negative case) and converters (positive case) by a classification model as a function of the total target population exposed to a stimulus. In this bar graph 1700 the target population was divided into 10 groups or deciles and the bar graph 1700 shows the number of users in each decile predicted to convert in response to the target stimulus. Target group 1704 includes those predicted by the classification model to respond to the target stimulus according to a predefined user response category when exposed to the target stimulus (i.e. converters 1702 in the target group 1704) and those predicted by the classification model to not respond to the target stimulus according to a predefined user response category when exposed to the target stimulus (i.e. non-converters 1706 in the excluded group 1708). An excluded group 1708 includes both those predicted by the classification model to respond to the target stimulus according to a predefined user response category if exposed to the target stimulus (i.e. converters in the target group) and those predicted by the classification model to not respond to the target stimulus according to a predefined user response category if exposed to the target stimulus (i.e. non-converters 1706 in the excluded group 1708).

In one or more embodiments, the computing device (e.g., computing device 1302) computes a positive predictive value (PPV) for the classification model by computing a first sum that is the number of users in the target group in the target population predicted by the classification model to respond to the target stimulus according to the predefined user response category (e.g., converters 1702 in target group 1704). Alternatively, or additionally the computing device computes a second sum that is the number of users in the target group in the target population (e.g., target group 1704). The computing device obtains a PPV by dividing the first sum by the second sum according to equation (2).

$$PPV = \frac{\text{Converters in Targeted Group}}{\text{Users in Targeted Group}} \quad (2)$$

In one or more embodiments, the computing device (e.g., computing device 1302) computes a negative predictive value (NPV) for the classification model by computing a first sum that is the number of users in the excluded group in the target population predicted by the classification model to not respond to the target stimulus according to the predefined user response category (e.g., non-converters 1706 in excluded group 1708). Alternatively, or additionally the computing device computes a second sum that is the number of users in the excluded group (e.g., excluded group 1708) in the target population.

In one or more embodiments, the computing device obtain the NPV by dividing the first sum by the second sum according to equation (2)

$$NPV = \frac{\text{Non-converters in Excluded Group}}{\text{Users in Excluded Group}} \quad (3)$$

In one or more embodiments, the computing device selects a location of a cut-off for a classification model in which a sum of the PPV and the NPV are at a maximum. For instance, the computing device computes a sum of PPV and NPV for each of sample locations of the cut-off to find the location where a sum of the PPV and the NPV are at a maximum. One of ordinary skill in the art will appreciate other ways to determine a cut-off location from the PPV and NPV (e.g., averaging a location area where the highest sums of the PPV and NPV are found by the computing device).

Figure 18A:
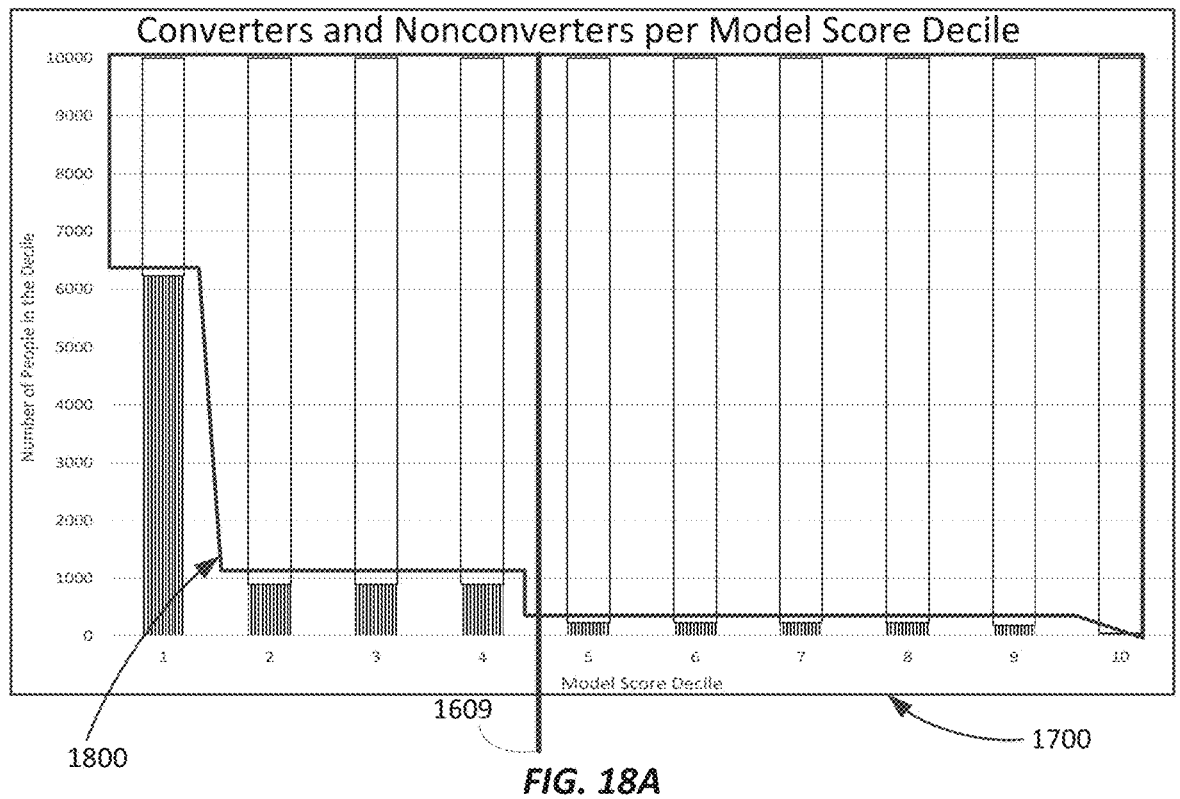
FIGS. 18A-18B illustrates an example with data for computing a sensitivity and a specificity for a classification model in at least one embodiment.
Figure 18B:
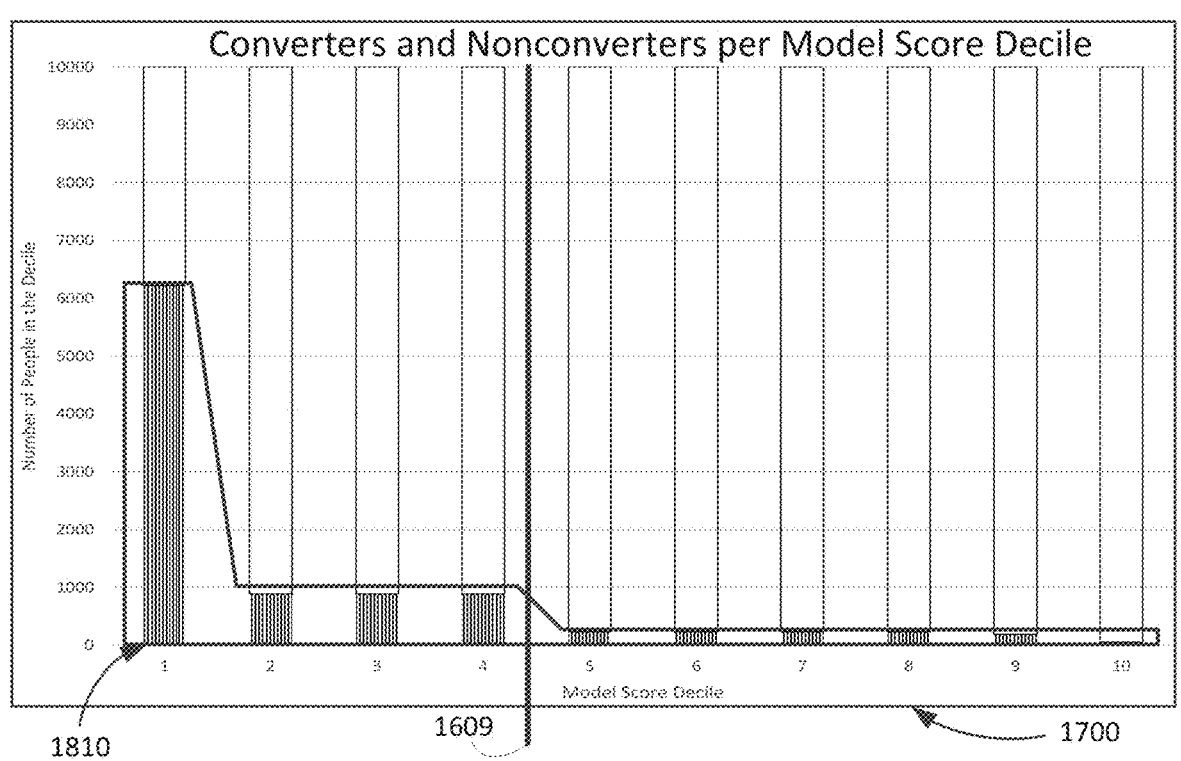

FIGS. 17 and 18A-18B illustrate data for computing a sensitivity and a specificity for a classification model in at least one embodiment. In one or more embodiments, a computing device (e.g., a computing device 1302) selects a location of a cut-off for a classification model based on computing a sensitivity and/or a specificity (e.g., in addition to, in response to, or alternatively with user input selecting an option for determining a location of a cut-off). Additionally or alternatively, the computing device determines a model quality metric (e.g., to determine predefined quality categories for the classification model and/or issue one or more indications of whether to use the classification model in employing the target stimulus).

FIGS. 18A and 18B illustrate a bar graph 1700 shown in FIG. 17. However different characteristics of this data is of interest in computing sensitivity and specificity.

In one or more embodiments, the computing device computes a sensitivity for the classification model by computing a first sum that is the number of users in the target group 1704 in the target population predicted by the classification model to respond to the target stimulus according to the predefined user response category (e.g., converters 1702). The computing device obtains a sensitivity by dividing the first sum by a total sum of all converters (e.g., converters 1810 as shown in FIG. 18B). In other words, the total sum is the first sum and a computed second sum that is the number of users in the excluded group in the target population predicted by the classification model to respond according to the predefined user response category if exposed to the target stimulus.

In one or more embodiments, the computing device computes a specificity for the classification model by computing a first sum that is the number of users in the excluded group in the target population predicted by the classification model to not respond to the target stimulus according to the predefined user response category (e.g., non-converters 1706 in excluded group 1708). The computing device obtains a specificity by dividing the first sum by a total sum of all non-converters (e.g., non-converters 1800 as shown in FIG. 18A). In other words, the total sum of all non-converters is the first sum and a computed second sum that is the number of users in the target group in the target population predicted by the classification model to not respond according to the predefined user response category if exposed to the target stimulus.

In one or more embodiments, sensitivity and/or specificity are used by the computing device to determine a model quality. Additionally or alternatively, a model quality is determined by comparing the classification model to a random model.

Figure 19:
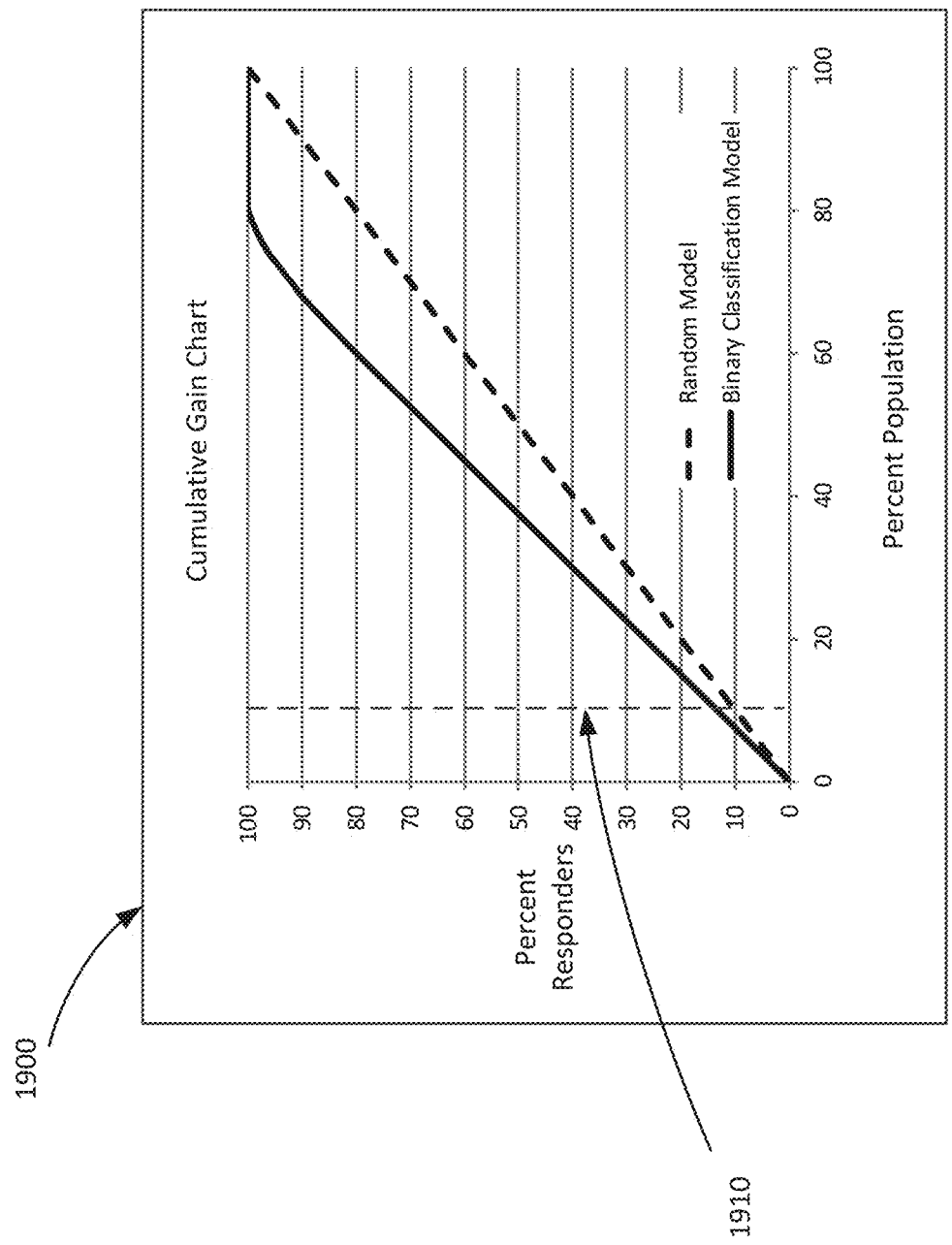
FIG. 19 illustrates an example of computed metrics for a classification model compared to computed metrics for a random model in at least one embodiment.

FIG. 19 illustrates computed metrics for a classification model compared to computed metrics for a random model in at least one embodiment. FIG. 19 shows a gain chart 1900 plotting calculated lifts as described herein for each of a classification model and a random model. A gain chart is also referred to as a lift chart.

In one or more embodiments, a computing device (e.g., computing device 1302) generates a classification model by generating classification model data indicating an arrangement in the classification model of the target population from most likely to respond to the target stimulus according to the predefined user response category to least likely to respond to the target stimulus according to the predefined user response category (shown here as percentage of the target population).

In one or more embodiments, the computing device determines a model quality metric by generating a random model. The generating a random model includes generating random model data indicating an arrangement in the random model of the target population in a random order and predicting a proportion of users in the target population arranged in a random order who will respond to a target stimulus according to a predefined user response category as a function of a proportion of users in the target population exposed to the target stimulus. The computing device compares a data value of the classification model to a data value of the random model correlated to a same number of users exposed to the target stimulus. For instance, if 10 percent of the target population (or a first decile) is exposed to the population (i.e. at line 1910), the random model would have a 10 percent lift compared to a 14 percent lift for the classification model. In one or more embodiments, the computing device determines or generates a quality metric based on the comparison of the data value of the classification model and the data value of the random model (e.g., a difference of the compared lifts).

Traditional approaches to determining whether to use a classification model as a basis for exposing a predicted proportion of users in the target population to the target stimulus required the user of a classification model to know when a statistical computing approach is applicable to a modeling scenario. For instance, an approach may be dependent on population changes (e.g., lift chart as described herein) and may not be appropriate to a modeling scenario in which sample populations provided to produce the classification model are not the same. The change in population may affect the determined quality for that model. Other approaches may not be dependent on population changes (e.g., approaches using a receiver operating characteristic (ROC) curve) as described herein and may be more appropriate for a given modeling scenario.

Traditional approaches to determining whether to use a classification model as a basis for exposing a predicted proportion of users in the target population to the target stimulus also required a user of a classification model to know the difference between good and bad values of a metric from a statistical computing approach, and the ways in which different metrics can signal different qualities about a predictive model. One or more embodiments herein provide a technological process that removes the need for an untrained user of a classification model to have this knowledge in exposing a target population to a stimulus. Further, one or more embodiments, provide a GUI that provides visual indications usable by an untrained user to assess model quality.

Figure 20:
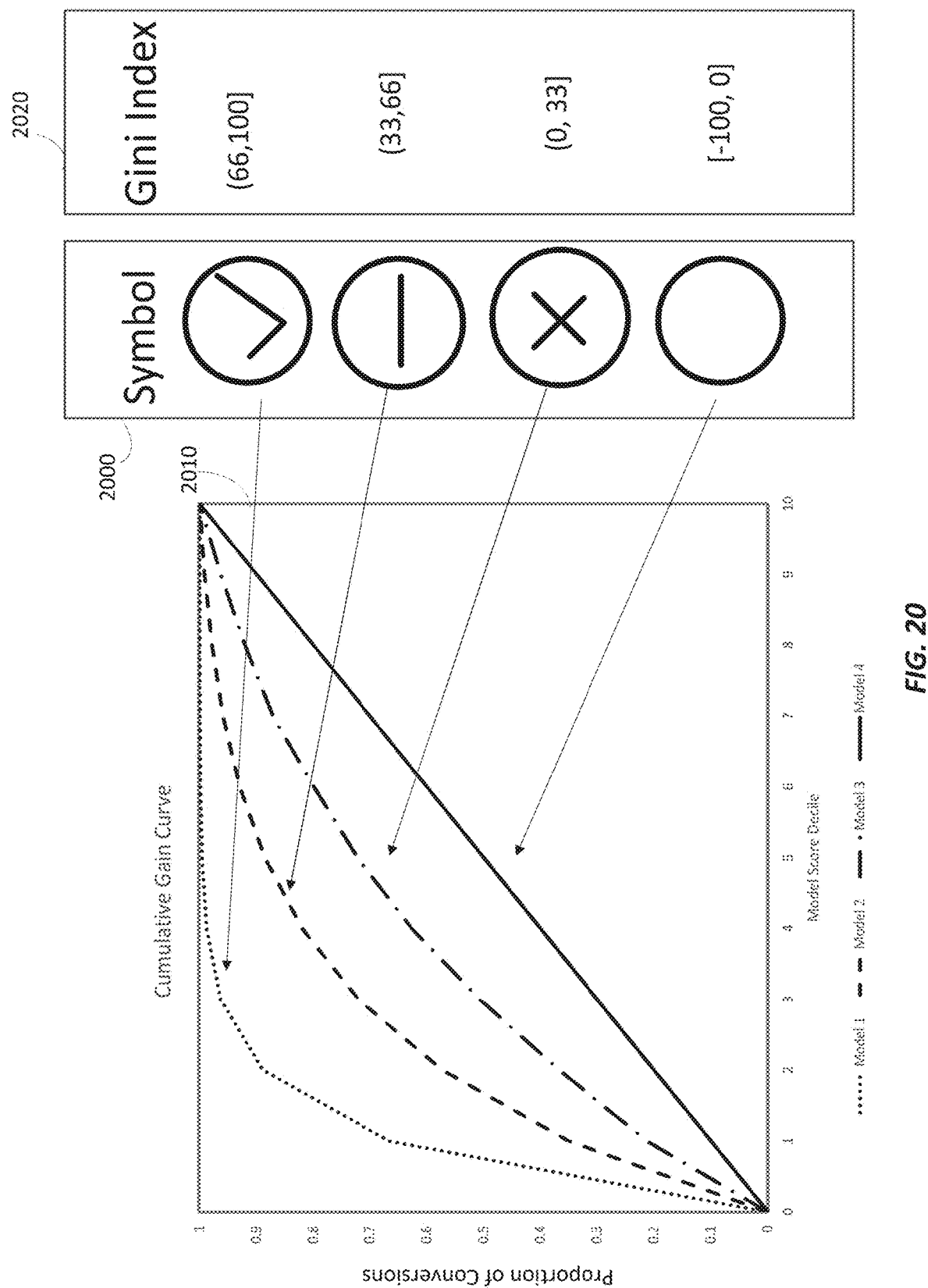
FIG. 20 illustrates an example of a set of indications of classification model quality in at least one embodiment.

FIG. 20 illustrates a set of indications of a classification model quality in at least one embodiment. As shown in FIG. 20, a set of symbols 2000 is defined for a given Gini Index and individual curves of a cumulative gain chart 2010 according to different models. Both a Gini index and a cumulative gain are statistical approaches used to assess model quality. In one or more embodiments, a computing device (e.g. computing device 1302) determines that these approaches are appropriate for the given model and combines both of these approaches for a defined set of symbols 2000 to display or otherwise issue to a user of a GUI to indicate whether to use the classification model as a basis for exposing the determined proportion of users in the target population to the target stimulus.

Traditionally, interpretation of a cumulative gains curve includes: understanding the meaning of the vertical and horizontal axes, understanding the meaning of the diagonal line drawn 0,0 to 1,1, and understanding the meaning of the position and shape of the curve. By issuing an indication in the GUI, a user of the GUI does not have to have any of this understanding. As shown in FIG. 20, a shape or design of the indication can graphically represent to the user a summation of the quality of the classification model based on computing one or more metrics related to a cumulative gains curve. A single shape can also represent multiple approaches for determining model quality.

Multiple approaches for determining model quality may include determining metrics related a Gini index (e.g., a Gini coefficient) or a receiver operating characteristic (ROC) curve metric. Calculation of these metrics may involve calculating or otherwise using other metrics described herein (e.g., a computed sensitivity for the classification model and computed specificity for the classification model).

An ROC curve is the plot between sensitivity and (1—specificity). (1—specificity) is also known as false positive rate and sensitivity is also known as True Positive rate. A ROC curve can be represented as a metric by determining the area under this curve (AUC).

Note that the area of entire square is 1*1=1. Hence AUC itself is the ratio under the curve and the total area. For instance, in one or more embodiments where an ROC curve is used to determine model quality, various metrics might be assigned different ratings, words or symbols issued as an indication of model quality as shown in Table 1.

TABLE 1

| AUC | Indication |
| --- | --- |
| .90-1 | excellent (A) |
| .80-.90 | good (B) |
| .70-.80 | fair (C) |
| .60-.70 | poor (D) |
| .50-.60 | fail (F) |

A gini coefficient (Gini) can be derived from the AUC ROC number using equation (4) below.

$$\text{Gini} = 2*\text{AUC} - 1 \quad (4)$$

For instance, a gini above 60% is a good model. As shown in FIG. 20, various gini coefficient or index ranges 2020 are also associated with a given symbol. In this way multiple or different approaches or metrics for determining model quality of a classification model can be used to generate an indication of the model quality.

In the example shown in FIG. 20, the Gini Index ranges 2020 are divided into 4 bins, [−100, 0], (0, 33], (33,66], (66,100], and assigned a shape correlated with a cumulative gains curve with a Gini index in that range.

In one or more embodiments, different aspects of the indication can be used to graphically represent one or more of different approaches to model quality by using various aspects of a same indicator (e.g., by assigning to an indication one of different patterns correlated with one approach to model quality and one of different shapes correlated with another approach to model quality).

Figure 21:
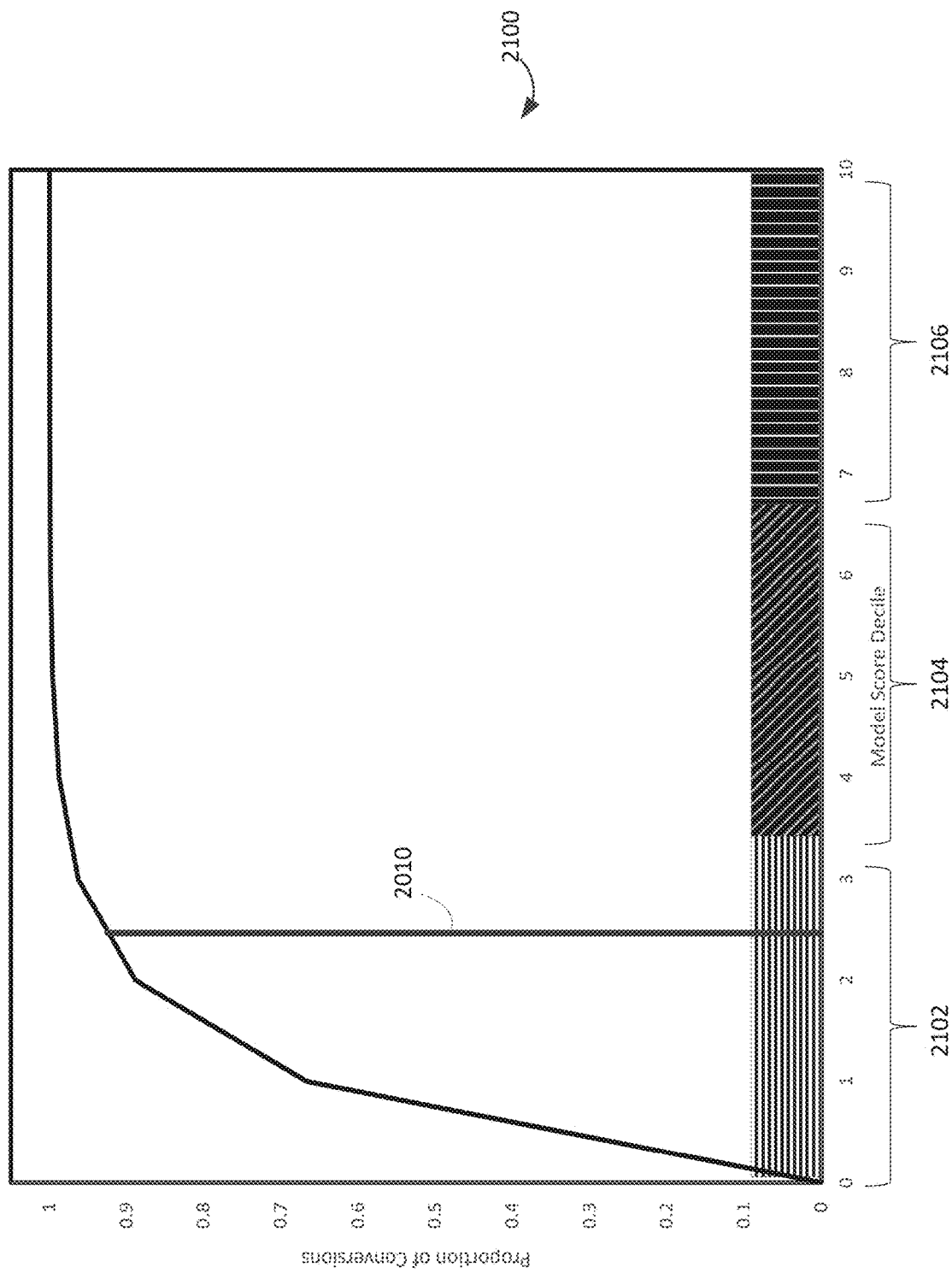
FIG. 21 illustrates an example of patterns assigned to different deciles of a classification model in at least one embodiment.

FIG. 21 illustrates patterns assigned to different deciles of a classification model 2100 in at least one embodiment. The target population of the classification model 2100 (represented in deciles) is divided into 3 ranges: a first range 2102 ([1, 3]), a second range 2104 ([4, 6]), and a third range 2106 ([7, 10]). These ranges are shown as three unequal ranges, but of course the target population could be divided differently (e.g., by equal ranges or more less than three ranges). A pattern is defined or otherwise assigned to each range. The pattern indicates the position of the recommended cut-off 2010 as described herein. Cut-off scores in the lower percentiles are in some situations preferable to cut-off scores in the higher percentiles because the model is being more selective when the cut-off score is lower. As explained above target population can be represented in many different ways. This example uses deciles but others could use quantile, percentages, etc.

Figure 22:
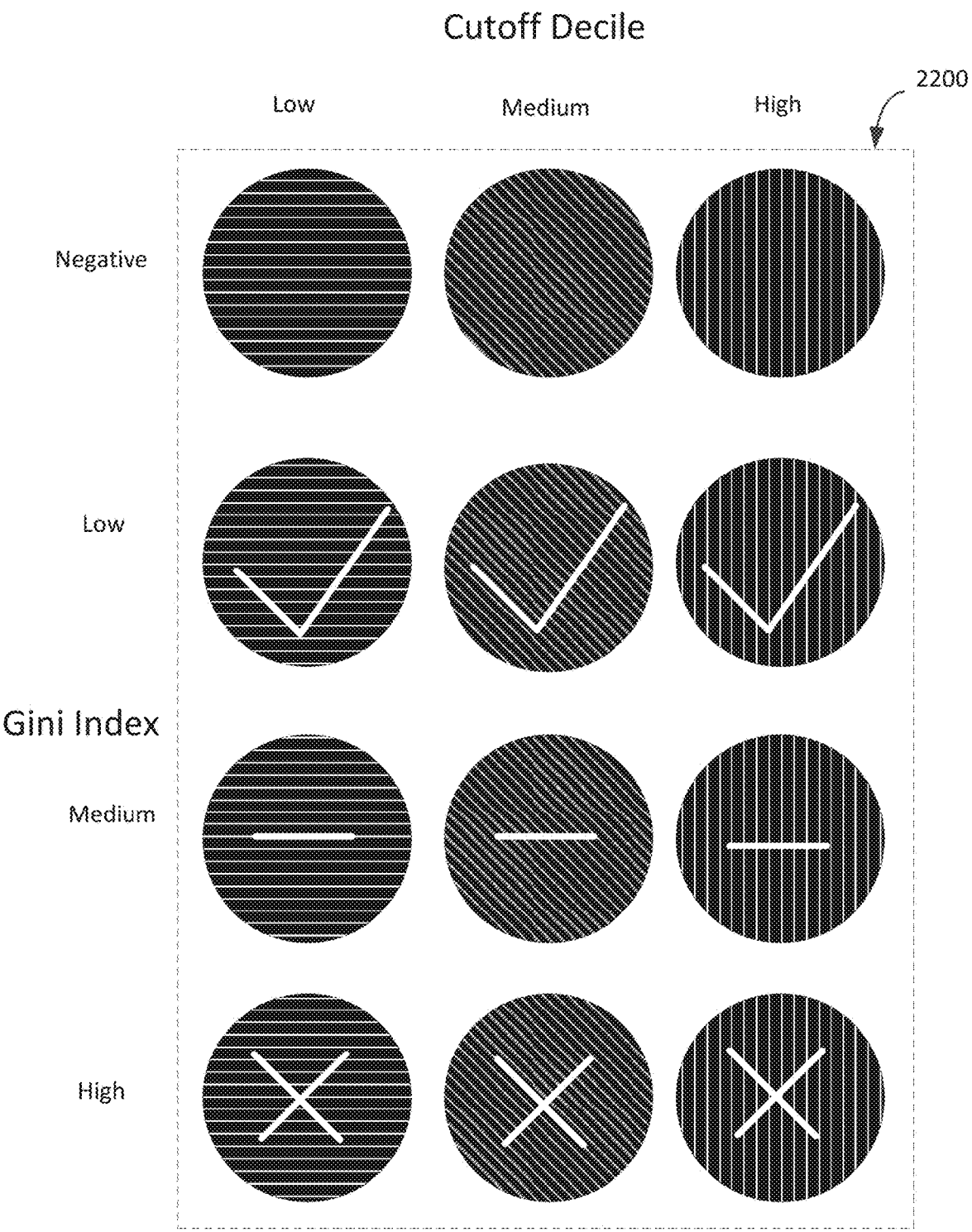
FIG. 22 illustrates an example of a set of indications of classification model quality in at least one embodiment.

FIG. 22 illustrates a set of indications 2200 of classification model quality in at least one embodiment. In particular, the set of indications shows combining the symbols of FIG. 20 and the patterns of FIG. 21 to create a 10-point model quality scale. Any one of these symbols can be issued (e.g., displayed in a GUI to indicate a model quality and whether the classification model should be used as a basis for providing the target stimulus).

In one or more embodiments, an issued indication displayed in the GUI can change in state to indicate a quality of a model has changed. For instance, the quality of the model could change in response to new sample population, an updated location of a cut-off, and/or a selection of a different option for the cut-off. A user of the GUI can interact with the GUI to augment the graphical representation of the classification model and know when the classification model is useful as a basis for exposing a target population to a target stimulus based on a current state of an indication displayed in the GUI.

For instance, a computing device as described herein receives updated input selecting a different option of the plurality of options. The computing device determines an updated location of a new cut-off in the classification model based on the updated input. The computing device generates or otherwise predicts new proportion data indicating a new proportion of users in the target population to expose to the target stimulus based on the updated location of the cut-off; and issues an updated state for the one or more indications indicating whether to use the classification model as a basis for exposing the new proportion of users in the target population to the target stimulus according to the new proportion data. FIG. 22 is merely an example of a set of visual indications that could be displayed. One of ordinary skill in the art will appreciate any symbols or patterns could be used instead. One or more symbols or aspects of symbols disclosed herein may be the subject of Design patent application No. 29/674055 and 29/674059 assigned to SAS Institute Inc. of Cary, N.C., USA.

Figure 23:
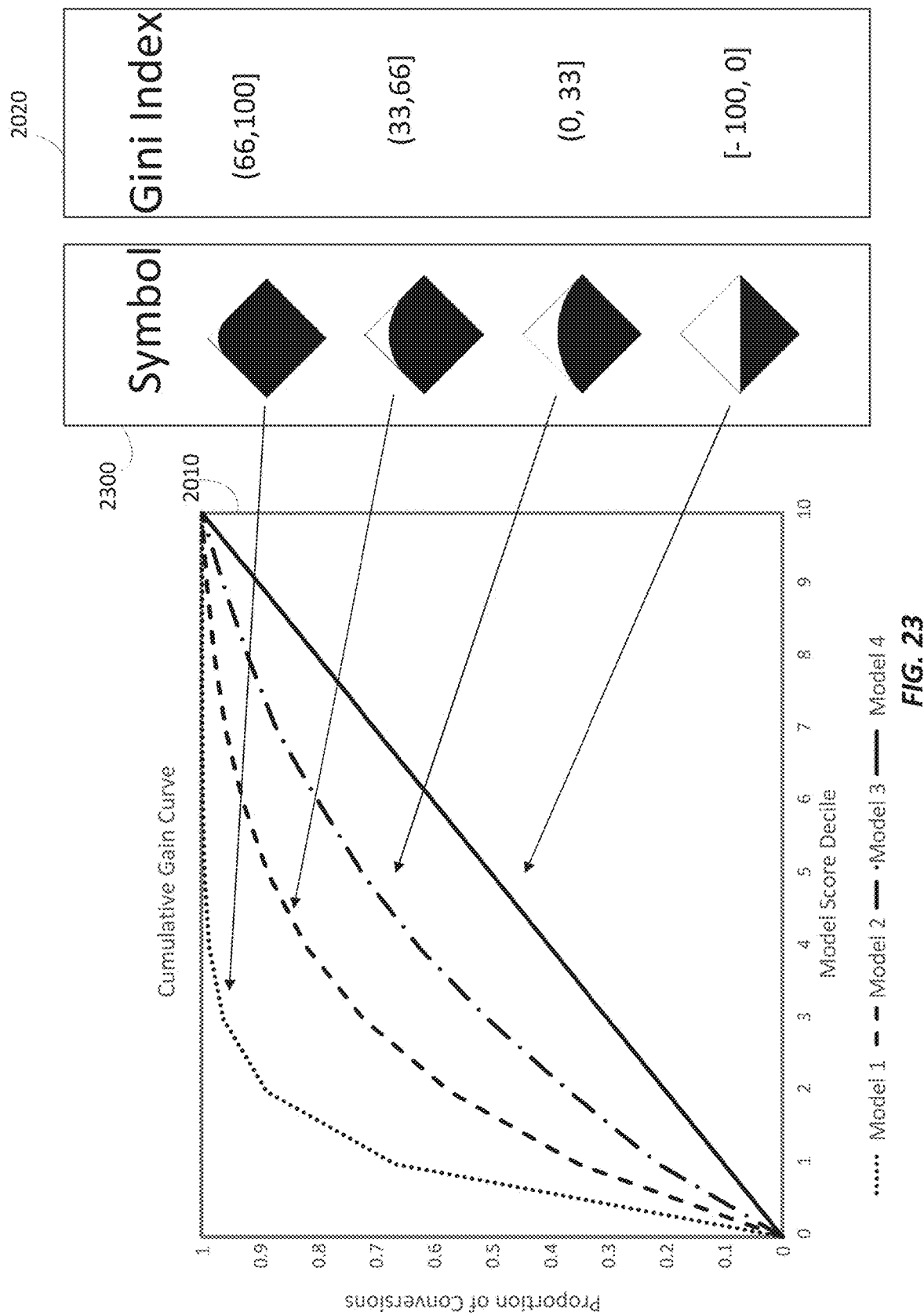
FIG. 23 illustrates an example of a set of indications of classification model quality in at least one embodiment.

FIG. 23 illustrates an alternative set of visual indications of classification model quality in at least one embodiment that uses a different symbol set 2300 correlated with the cumulative gain chart 2010 and Gini index ranges 2020.

Figure 24:
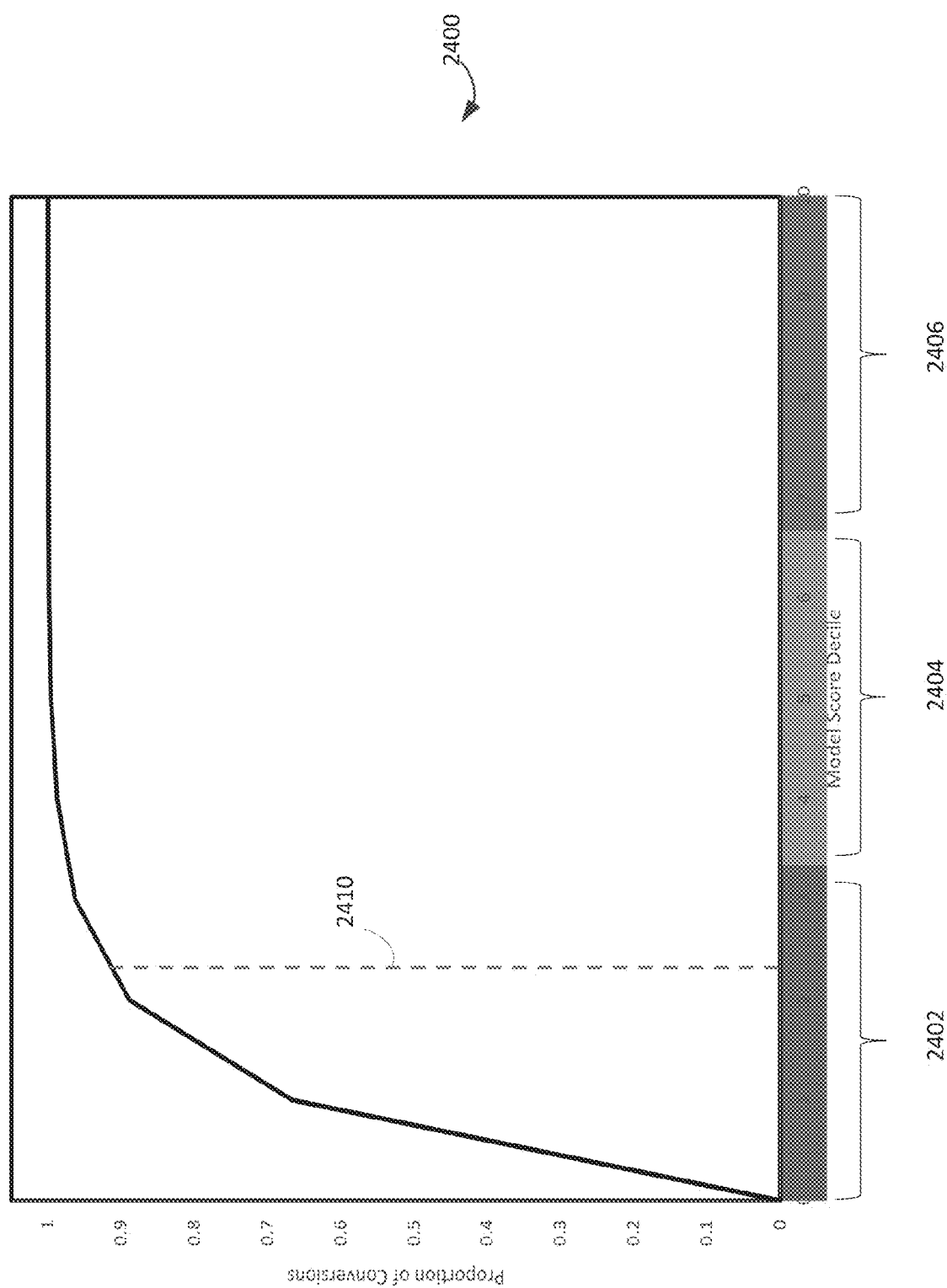
FIG. 24 illustrates example colors assigned to different deciles of a classification model in at least one embodiment.

FIG. 24 illustrates colors assigned to different deciles of a classification model 2400 in at least one embodiment. The target population of the classification model 2100 (represented in deciles) is divided into 3 ranges: a first range 2102 ([1, 3]), a second range 2104 ([4, 6]), and a third range 2106 ([7, 10]). A color is defined or otherwise assigned to each range. The color indicates the position of the recommended cut-off 2010 as described herein. This example uses deciles but others could use quantile, percentages, etc.

Figure 25:
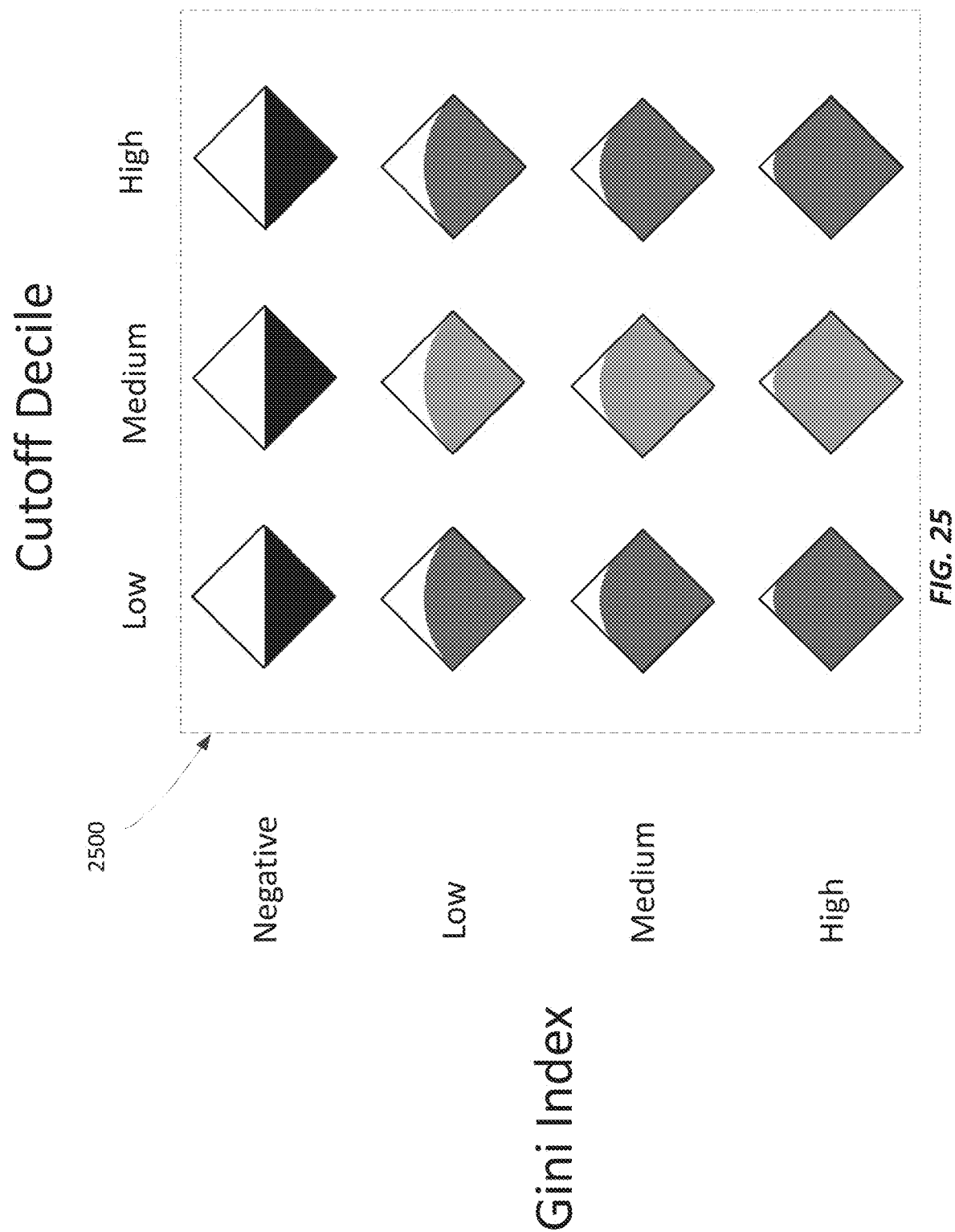
FIG. 25 illustrates an example of a set of indications of classification model quality in at least one embodiment.

FIG. 25 illustrates a set of indications 2500 of classification model quality in at least one embodiment. In particular, the set of indications 2500 shows combining the symbols of FIG. 23 and the colors of FIG. 24 to create a 10-point model quality scale. Any one of these symbols can be issued (e.g., displayed in a GUI to indicate a model quality and whether the classification model should be used as a basis for providing the target stimulus). One of ordinary skill in the art will appreciate other symbols that could be used to visually represent to a user of a GUI whether to whether to use the classification model as a basis for exposing the determined proportion of users in the target population to the target stimulus.

One or more embodiments herein are useful for applications in which a decision threshold or cut-off score is useful to separate a population into at least two groups, one group whose predicted response is "negative" and one group whose predicted response is "positive." However embodiments described herein are useful in other applications other than those described herein (e.g., in applications in which (1) a user of the graphical user interface has an action that can be taken to influence a system, and (2) a limit on some resource involved in taking the action). For instance, one such application is town residents receiving free water cisterns or a discount to purchase water cisterns (e.g., via transmitting an electronic voucher) to encourage water recycling and conservation. Water reuse by residents reduces the demand for fresh water, so conversion of the residents to water recycling is beneficial but the water cisterns are an expensive resource. Assuming the town cannot make this offer to every resident, one or more embodiments provide a graphical user interface indicating a quality or cut-off for a predictive model to help the town decide which residents (1) would most likely respond to an offer for a free or discounted cistern (e.g. based on data indicating an electronic purchase), and (2) actually use the cistern (e.g. as tracked by a sensor of a water cistern or electronic surveys of users) thereby reducing the demand for water. A graphical user interface as described herein gives the user of the graphical user interface a way to get the most effect out of the least expenditure of the limited resource by separating a population into at least a targeted group and excluded group.

What is claimed is:

1. A computer-program product tangibly embodied in a non-transitory machine-readable storage medium, the computer-program product including instructions operable to cause a computing device to:
   receive received data regarding results of exposing a sample population to a sample stimulus;
   generate, based on the received data, a classification model providing prediction data indicating predicted users in a target population who will respond to a target stimulus according to a predefined user response category;
   display in a graphical user interface (GUI):
      a graphical representation of the generated classification model,
         wherein the graphical representation plots, according to the generated classification model, the prediction data as a function of a variable number of users eligible to receive the target stimulus; and
         wherein a cut-off in the graphical representation graphically separates the variable number of users of the classification model into two regions, a first region that corresponds to target data for a target group to receive the target stimulus and a second region that corresponds to exclusion data for an excluded group to not receive the target stimulus; and
      a plurality of options each specifying one of different objectives for determining a proportion of users in the target population to expose to the target stimulus, wherein the plurality of options control a location of the cut-off in the graphical representation and comprise a first option that indicates that the location of the cut-off accounts for a first factor for increasing a number of targeted users who will respond to the target stimulus according to a predefined user response category and a second factor related to a detriment of a user of the GUI from employing the target stimulus, the first factor different from the second factor;
   receive data input from the user of the GUI selecting a selected option of the plurality of options;
   determine the location of the cut-off in the graphical representation of the generated classification model based on the selected option;
   predict proportion data indicating the proportion of users in the target population to expose to the target stimulus based on the determined location of the cut-off;
   determine one of predefined quality categories for the classification model; and
   responsive to the received data input and the determined one of the predefined quality categories, issue one or more indications as to whether to use the classification model as a basis for exposing the proportion of users in the target population to the target stimulus according to the proportion data.

2. The computer-program product of claim 1, wherein the instructions are operable to issue the one or more indications comprising a quality indication of model quality by:

generating an icon corresponding to the determined one of the predefined quality categories for the classification model; and displaying in the GUI in connection to the graphical representation of the classification model the icon indicating a quality of a predictive value of the classification model.

3. The computer-program product of claim 2, wherein the instructions are operable to issue the one or more indications by:

generating quality data indicating a plurality of model quality metrics for the predictive value of the classification model, wherein each model quality metric is based on a different approach for evaluating the quality of the predictive value of the classification model;

using the generated quality data to determine the icon indicating a quality of the predictive value of the classification model, wherein the icon represents the plurality of model quality metrics holistically; and displaying in the GUI the icon that represents the plurality of model quality metrics holistically.

4. The computer-program product of claim 3, wherein the instructions are operable to:

generate the classification model by generating classification model data indicating an arrangement in the classification model of the target population from most likely to respond to the target stimulus according to the predefined user response category to least likely to respond to the target stimulus according to the predefined user response category; and determine a first model quality metric of the plurality of model quality metrics by:

generating a random model comprising generating random model data indicating an arrangement in the random model of the target population in a random order and predicting a proportion of users in the target population arranged in a random order who will respond to a target stimulus according to a predefined user response category as a function of a proportion of users in the target population exposed to the target stimulus;

comparing a data value of the classification model to a data value of the random model correlated to a same number of users exposed to the target stimulus; and determining the first model quality metric of the plurality of model quality metrics based on the comparison of the data value of the classification model and the data value of the random model.

5. The computer-program product of claim 3, wherein the instructions are operable to determine a second model quality metric of the plurality of model quality metrics by:

computing a sensitivity for the classification model by:

computing a first sum that is a number of users in the target group in the target population predicted by the classification model to respond to the target stimulus according to the predefined user response category;

computing a second sum that is a number of users in the excluded group in the target population predicted by the classification model to respond to the target stimulus according to the predefined user response category; and outputting the sensitivity as the first sum divided by a total of the first sum and the second sum;

computing a specificity for the classification model by:

computing a third sum that is a number of users in the target group in the target population predicted by the classification model to not respond to the target stimulus according to the predefined user response category;

computing a fourth sum that is a number of users in the excluded group in the target population predicted by the classification model to not respond to the target stimulus according to the predefined user response category; and outputting the specificity as the fourth sum divided by a total of the third sum and the fourth sum.

6. The computer-program product of claim 5, wherein the instructions are operable to determine the second model quality metric of the plurality of model quality metrics by determining a Gini coefficient or a receiver operating characteristic (ROC) curve metric using the computed sensitivity for the classification model and the computed specificity for the classification model.

7. The computer-program product of claim 1, wherein the instructions are operable to issue the one or more indications by displaying, at the determined location of the cut-off, a divider of the users eligible to receive the target stimulus represented in the graphical representation of the generated classification model.

8. The computer-program product of claim 7, wherein the instructions are operable to determine the location of a cut-off based on the received data input and further by:

computing a sensitivity for the classification model by:

computing a first sum that is a number of users in the target group in the target population predicted by the classification model to respond to the target stimulus according to the predefined user response category;

computing a second sum that is a number of users in the excluded group in the target population predicted by the classification model to respond to the target stimulus according to the predefined user response category; and obtaining the sensitivity by dividing the first sum by a total of the first sum and the second sum;

computing a specificity for the classification model by:

computing a third sum that is a number of users in the target group in the target population predicted by the classification model to not respond to the target stimulus according to the predefined user response category;

computing a fourth sum that is a number of users in the excluded group in the target population predicted by the classification model to not respond to the target stimulus according to the predefined user response category; and obtaining the specificity by dividing the fourth sum by a total of the third sum and the fourth sum; and selecting the location of the cut-off for the classification model in which a sum of the specificity and the sensitivity are at a maximum, wherein the divider represents the cut-off at the selected location.

9. The computer-program product of claim 7, wherein the instructions are operable to determine the location of the cut-off based on the received input and further by:

computing a positive predictive value (PPV) for the classification model by:

computing a first sum that is a number of users in the target group in the target population predicted by the classification model to respond to the target stimulus according to the predefined user response category;

computing a second sum that is a number of users in the targeted group in the target population; and obtain the PPV by dividing the first sum by the second sum;
computing a negative predictive value (NPV) for the classification model by:
computing a third sum that is a number of users in the excluded group in the target population predicted by the classification model to not respond to the target stimulus according to the predefined user response category;
computing a fourth sum that is a number of users in the excluded group in the target population; and
obtain the NPV by dividing the third sum by the fourth sum; and
selecting the location of the cut-off for the classification model in which a sum of the PPV and the NPV are at a maximum, wherein the divider represents the cut-off at the selected location.

10. The computer-program product of claim 1, wherein the instructions are operable to:
compute a metric to determine a benefit of increasing excluded users who will not respond to a target stimulus according to the predefined user response category; and
display in the GUI a second option of the plurality of options different from the first option that accounts for the first factor and the metric.

11. The computer-program product of claim 1, wherein the instructions are operable to:
compute a first data metric to obtain a conversion rate of excluded users predicted to respond to the target stimulus according to the predefined user response if exposed to the target stimulus; and
compute a second data metric to obtain a conversion rate of targeted users predicted to respond with the predefined user response to the target stimulus if exposed to the target stimulus; and
display in the GUI a second option of the plurality of options different from the first option that accounts for the first data metric and the second data metric.

12. The computer-program product of claim 1, wherein the instructions are operable to:
obtain sample population data comprising sample characteristics of users of the sample population;
determine associations by associating respective ones of the sample characteristics with certain behaviors in the sample population in response to the sample stimulus;
obtain target population data comprising target characteristics of users in the target population;
determine, based on the determined associations, a likelihood of a particular characteristic of the target characteristics of users in the target population correlating with responding to the target stimulus according to the predefined user response category to the target stimulus; and
generate the classification model by generating classification model data indicating an arrangement of the users in the target population in the classification model based on the determined likelihood.

13. The computer-program product of claim 1, wherein the instructions are operable to:
receive results data indicating results of exposing one or more users in the target population to the target stimulus;
update, based on the results data, the classification model displayed in the GUI; and
issue an indication indicating a change in quality of the classification model or location of the cut-off that accounts for the results data.

14. The computer-program product of claim 1, wherein the instructions are operable to:
receive updated input selecting a different option of the plurality of options;
determine an updated location of a new cut-off in the classification model based on the updated input;
predict new proportion data indicating a new proportion of users in the target population to expose to the target stimulus based on the updated location of the cut-off; and
issue an updated state for the one or more indications indicating whether to use the classification model as a basis for exposing the new proportion of users in the target population to the target stimulus according to the new proportion data.

15. The computer-program product of claim 1, wherein the instructions are operable to:
receive user input adjusting the location of the cut-off displayed in the classification model; and
update the display of the classification model in the GUI to display an updated location for the cut-off.

16. The computer-program product of claim 1, wherein the instructions are operable to:
receive campaign data regarding results of a campaign to convert the sample population to select a first candidate person or product in response to the sample stimulus that is a first campaign approach;
generate the classification model predicting the proportion of users in the target population who will select a second candidate person or product in response to the target stimulus that is a second campaign approach; and
issue the one or more indications indicating whether to use the second campaign approach based on the classification model.

17. The computer-program product of claim 1, wherein the instructions are operable to:
receive medical data regarding results of a medical study to observe improvement to a health of individual users of the sample population treated with a medical treatment;
generate the classification model predicting a proportion of users in the target population whose health will improve in response to the target stimulus that is based on the medical treatment; and
issue the one or more indications indicating whether to administer the medical treatment based on the classification model.

18. The computer-program product of claim 1, wherein the instructions are operable to:
receive attrition data regarding attrition rates of a sample population comprising a category of people exposed to a sample stimulus that is an environment factor for an environment for the people;
generate the classification model predicting the proportion of users in the target population who will leave or stay in the environment for the people in response to the target stimulus that is based on the environment factor; and
issue the one or more indications indicating whether to employ the target stimulus based on the classification model.

19. The computer-program product of claim 1, wherein the instructions are operable to:

receive, in response to the one or more indications, input from the user of the GUI indicating to employ the target stimulus;

generate the target stimulus in response to the input indicating to employ the target stimulus; and disseminate the generated target stimulus to the target group.

20. A computer-implemented method comprising:

receiving received data regarding results of exposing a sample population to a sample stimulus;

generating, based on the received data, a classification model providing prediction data indicating predicted users in a target population who will respond to a target stimulus according to a predefined user response category;

displaying in a graphical user interface (GUI):
  a graphical representation of the generated classification model,
    wherein the graphical representation plots, according to the generated classification model, the prediction data as a function of a variable number of users eligible to receive the target stimulus; and
    wherein a cut-off in the graphical representation graphically separates the variable number of users of the classification model into two regions, a first region that corresponds to target data for a target group to receive the target stimulus and a second region that corresponds to exclusion data for an excluded group to not receive the target stimulus; and
  a plurality of options each specifying one of different objectives for determining a proportion of users in the target population to expose to the target stimulus, wherein the plurality of options control a location of the cut-off in the graphical representation and comprise a first option that indicates that the location of the cut-off accounts for a first factor for increasing a number of targeted users who will respond to the target stimulus according to a predefined user response category and a second factor related to a detriment of a user of the GUI from employing the target stimulus, the first factor different from the second factor;

receiving data input from the user of the GUI selecting a selected option of the plurality of options;

determining the location of the cut-off in the graphical representation of the generated classification model based on the selected option;

predicting proportion data indicating the proportion of users in the target population to expose to the target stimulus based on the determined location of the cut-off;

determining one of predefined quality categories for the classification model; and responsive to the received data input and the determined one of the predefined quality categories, issuing one or more indications as to whether to use the classification model as a basis for exposing the proportion of users in the target population to the target stimulus according to the proportion data.

21. The computer-implemented method of claim 20, further comprising:

receiving, in response to the one or more indications, input from the user of the GUI indicating to employ the target stimulus;

generating the target stimulus in response to the input indicating to employ the target stimulus; and disseminating the generated target stimulus to the target group.

22. The computer-implemented method of claim 20, wherein the issuing one or more indications comprises displaying, at the determined location of the cut-off, a divider of the users eligible to receive the target stimulus represented in the graphical representation of the generated classification model.

23. The computer-implemented method of claim 20, wherein the issuing one or more indications comprises issuing a quality indication of model quality by:

generating an icon corresponding to the determined one of the predefined quality categories for the classification model; and displaying in the GUI in connection to the graphical representation of the classification model the icon indicating a quality of a predictive value of the classification model.

24. The computer-implemented method of claim 23, further comprising:

generating quality data indicating a plurality of model quality metrics for the predictive value of the classification model, wherein each model quality metric is based on a different approach for evaluating the quality of the predictive value of the classification model;

using the generated quality data to determine the icon indicating a quality of the predictive value of the classification model, wherein the icon represents the plurality of model quality metrics holistically; and displaying in the GUI the icon that represents the plurality of model quality metrics holistically.

25. The computer-implemented method of claim 20, further comprising:

computing a metric to determine a benefit of increasing excluded users who will not respond to a target stimulus according to the predefined user response category; and displaying in the GUI a second option of the plurality of options different from the first option that accounts the first factor and the metric.

26. The computer-implemented method of claim 20, further comprising:

computing a first metric to obtain a conversion rate of excluded users predicted to respond to the target stimulus according to the predefined user response if exposed to the target stimulus; and computing a second metric to obtain a conversion rate of targeted users predicted to respond with the predefined user response to the target stimulus if exposed to the target stimulus; and displaying in the GUI a second option of the plurality of options different from the first option that accounts for the first metric and the second metric.

27. The computer-implemented method of claim 20, further comprising:

obtaining sample population data comprising sample characteristics of users of the sample population;

determining associations by associating respective ones of the sample characteristics with certain behaviors in the sample population in response to the sample stimulus;

obtaining target population data comprising target characteristics of users in the target population;

determining, based on the determined associations, a likelihood of a particular characteristic of the target characteristics of users in the target population correlating with responding to the target stimulus according to the predefined user response category to the target stimulus; and generating the classification model by generating classification model data indicating an arrangement of users in the target population in the classification model based on the determined likelihood.

28. The computer-implemented method of claim 20, further comprising:

receiving results data indicating results of exposing one or more users in the target population to the target stimulus;

updating, based on the results data, the classification model displayed in the GUI; and issuing an indication indicating a change in quality of the classification model or location of the cut-off that accounts for the received information.

29. The computer-implemented method of claim 20, further comprising:

receiving updated input selecting a different option of the plurality of options;

determining an updated location of a new cut-off in the classification model based on the updated input;

predicting new proportion data indicating a new proportion of users in the target population to expose to the target stimulus based on the updated location of the cut-off; and issuing an updated state for the one or more indications indicating whether to use the classification model as a basis for exposing the new proportion of users in the target population to the target stimulus according to the new proportion data.

30. A computing device comprising processor and memory, the memory containing instructions executable by the processor wherein the computing device is configured to:

receive received data regarding results of exposing a sample population to a sample stimulus;

generate, based on the received data, a classification model providing prediction data indicating predicted users in a target population who will respond to a target stimulus according to a predefined user response category;

display in a graphical user interface (GUI):

a graphical representation of the generated classification model, wherein the graphical representation plots, according to the generated classification model, the prediction data as a function of a variable number of users eligible to receive the target stimulus; and wherein a cut-off in the graphical representation graphically separates the variable number of users of the classification model into two regions, a first region that comprises target data for a target group to receive the target stimulus and a second region that comprises exclusion data for an excluded group to not receive the target stimulus; and a plurality of options each specifying one of different objectives for determining a proportion of users in the target population to expose to the target stimulus, wherein the plurality of options control a location of the cut-off in the graphical representation and comprise a first option that indicates that the location of the cut-off accounts for a first factor for increasing a number of targeted users who will respond to the target stimulus according to a predefined user response category and a second factor related to a detriment of a user of the GUI from employing the target stimulus, the first factor different from the second factor;

receive data input from the user of the GUI selecting a selected option of the plurality of options;

determine the location of the cut-off in the graphical representation of the generated classification model based on the selected option;

predict proportion data indicating the proportion of users in the target population to expose to the target stimulus based on the determined location of the cut-off;

determine one of predefined quality categories for the classification model; and responsive to the received data input and the determined one of the predefined quality categories, issue one or more indications as to whether to use the classification model as a basis for exposing the proportion of users in the target population to the target stimulus according to the proportion data.

* * * * *